Aug. 28, 1934.  H. D. MORTON  1,971,828
SOUND PROJECTOR MOVING, ORIENTING, AND TILTING APPARATUS
Filed June 1, 1929  21 Sheets-Sheet 2

Inventor
Harry D. Morton

Aug. 28, 1934.    H. D. MORTON    1,971,828
SOUND PROJECTOR MOVING, ORIENTING, AND TILTING APPARATUS
Filed June 1, 1929    21 Sheets-Sheet 3

Inventor:
Harry D. Morton

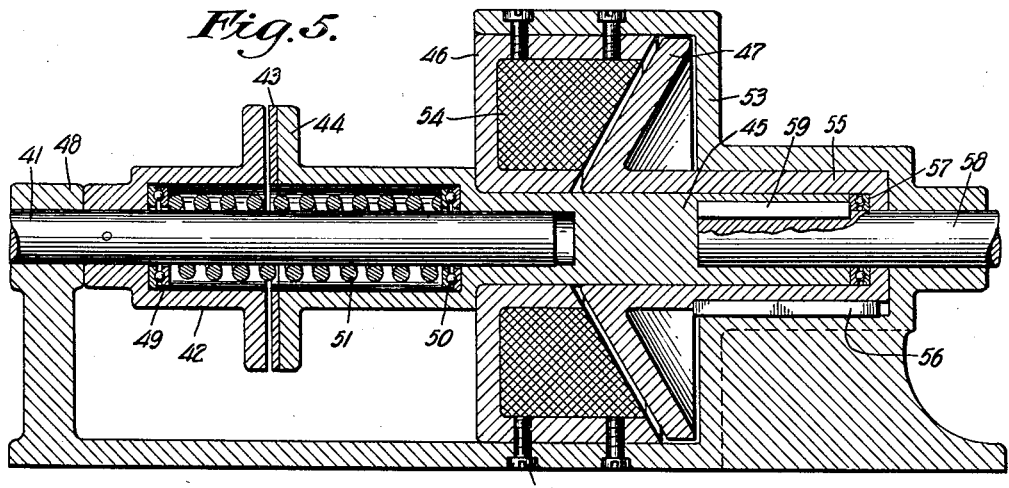
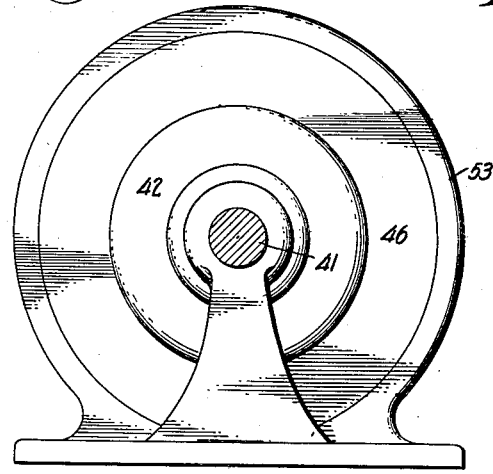
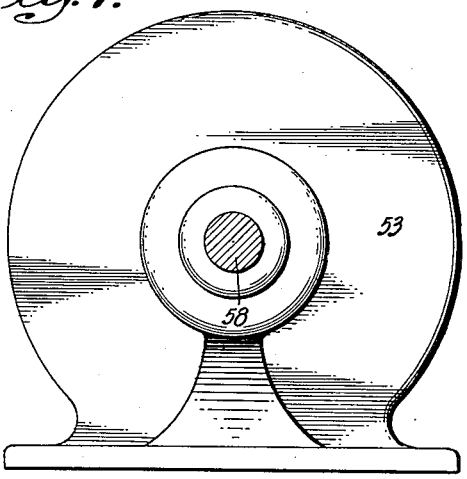
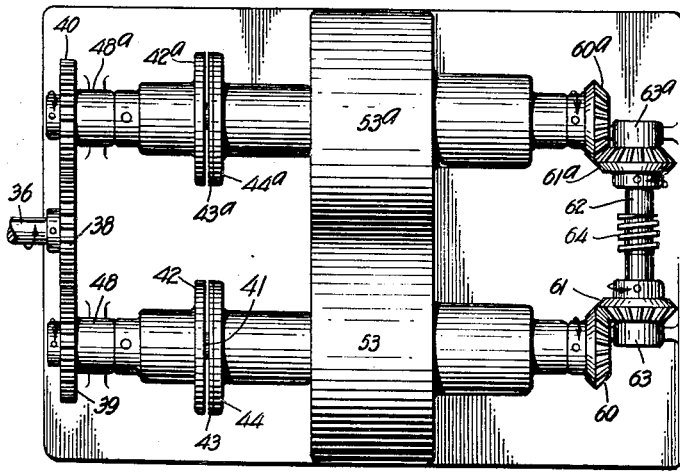

Aug. 28, 1934.  H. D. MORTON  1,971,828
SOUND PROJECTOR MOVING, ORIENTING, AND TILTING APPARATUS
Filed June 1, 1929  21 Sheets-Sheet 6
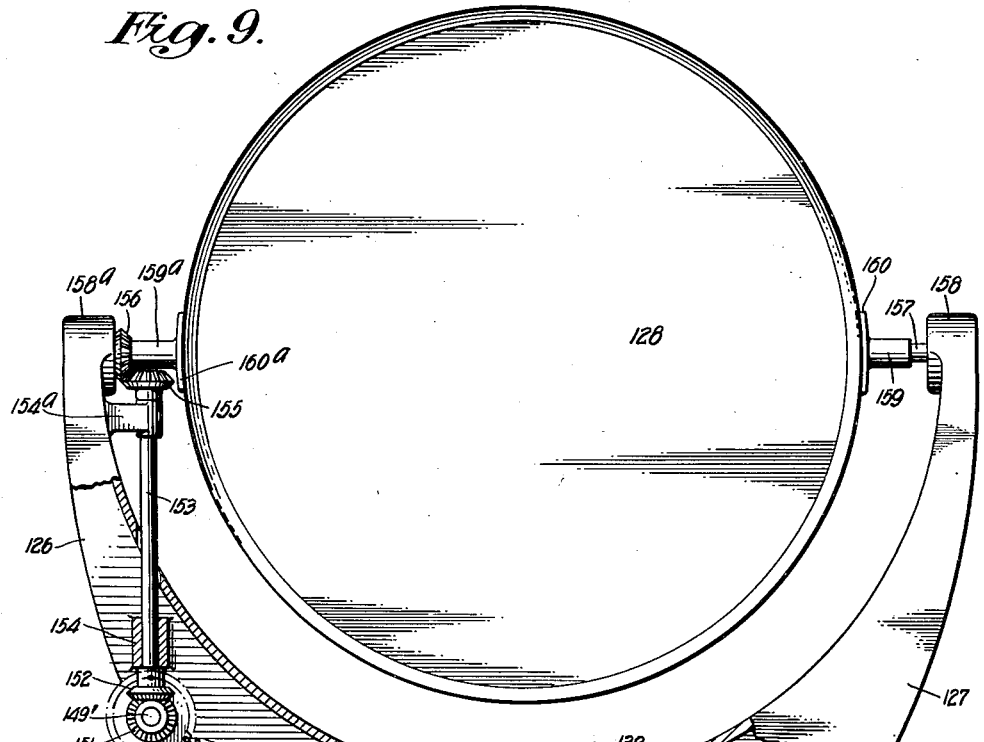
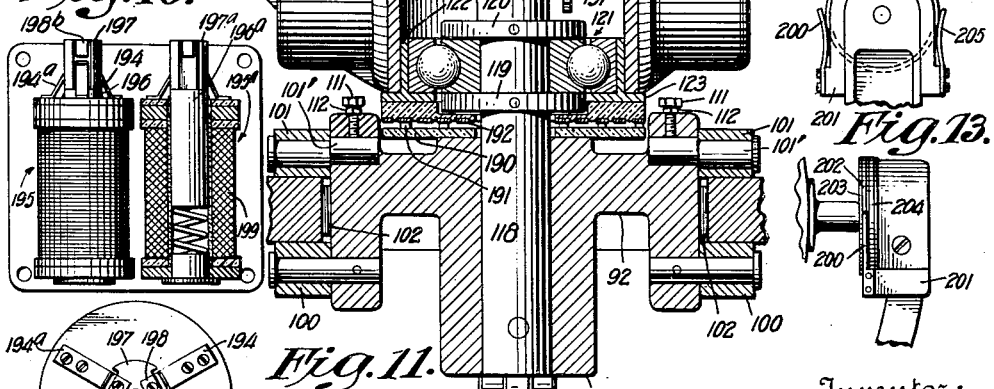
Inventor:
Harry D. Morton Aug. 28, 1934.  H. D. MORTON  1,971,828
SOUND PROJECTOR MOVING, ORIENTING, AND TILTING APPARATUS
Filed June 1, 1929  21 Sheets-Sheet 7

Inventor
Harry D. Morton

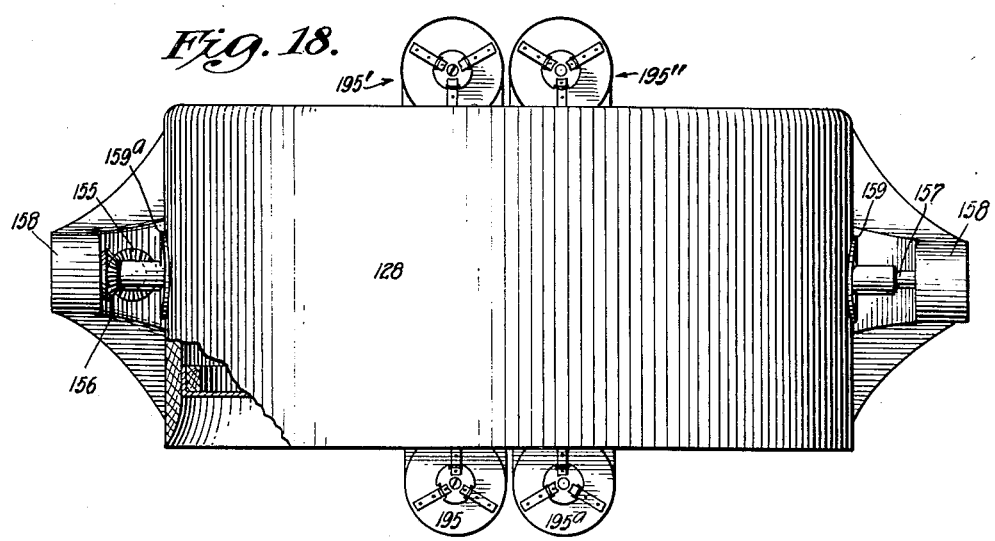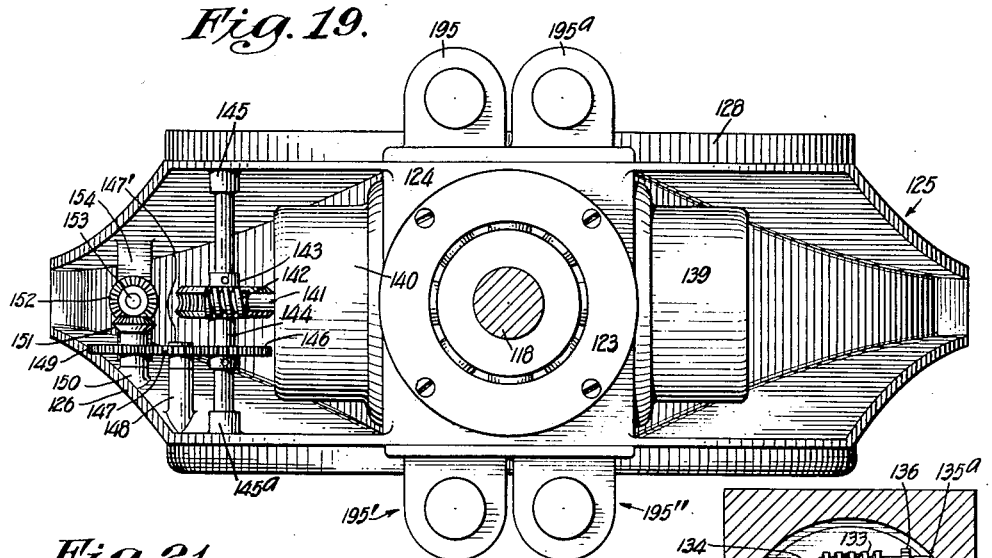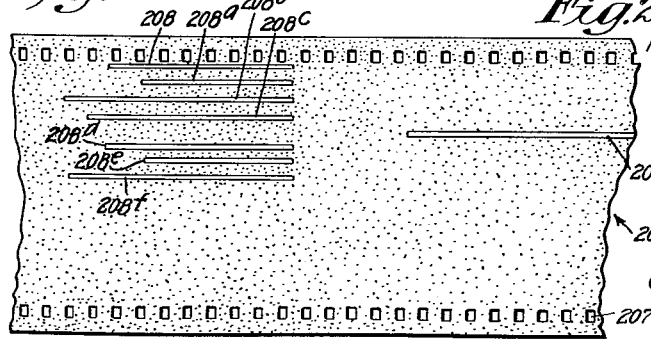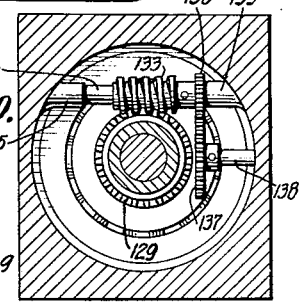

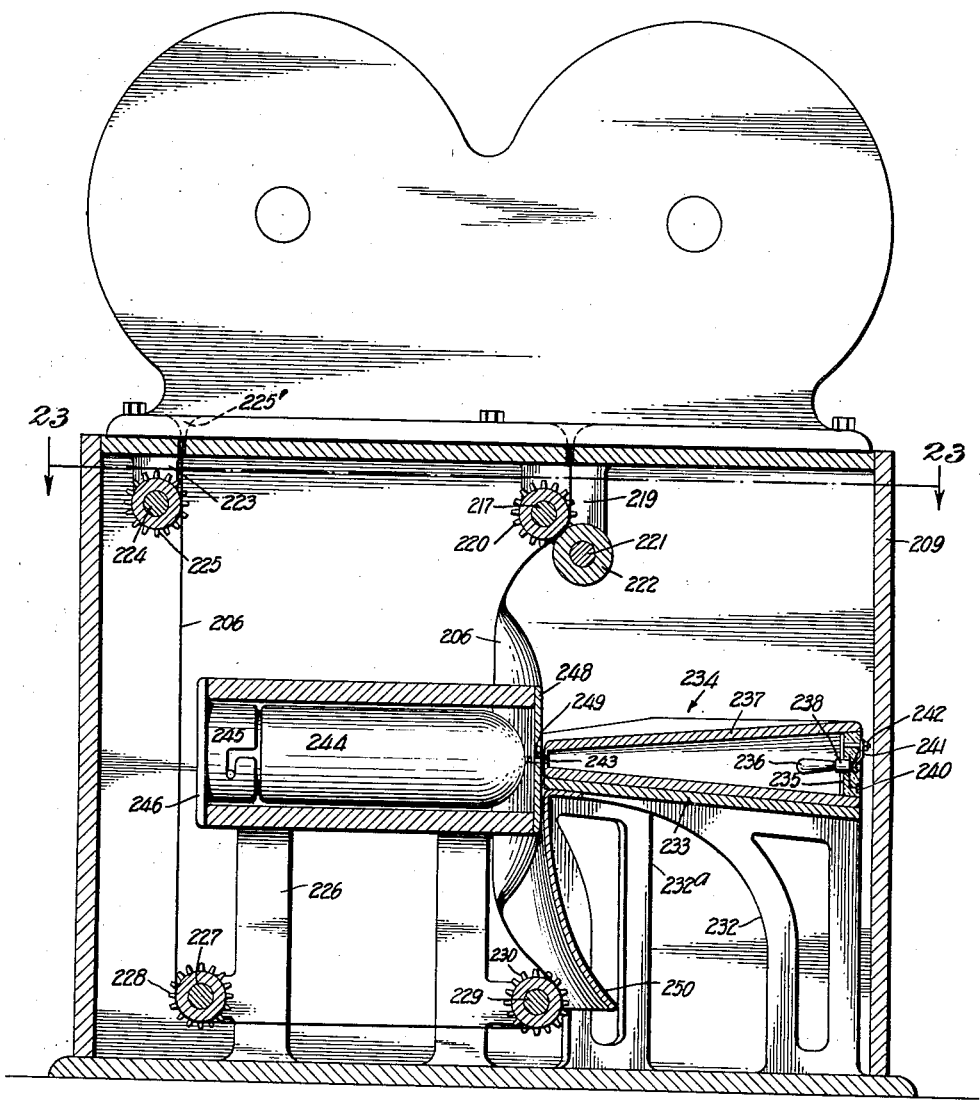

Aug. 28, 1934.  H. D. MORTON  1,971,828
SOUND PROJECTOR MOVING, ORIENTING, AND TILTING APPARATUS
Filed June 1, 1929   21 Sheets-Sheet 10

Inventor
Harry D. Morton

Inventor
Harry D. Morton

Aug. 28, 1934.  H. D. MORTON  1,971,828
SOUND PROJECTOR MOVING, ORIENTING, AND TILTING APPARATUS
Filed June 1, 1929  21 Sheets-Sheet 12

INVENTOR.
Harry D. Morton

Aug. 28, 1934.  H. D. MORTON  1,971,828
SOUND PROJECTOR MOVING, ORIENTING, AND TILTING APPARATUS
Filed June 1, 1929    21 Sheets-Sheet 13

Inventor
Harry D. Morton

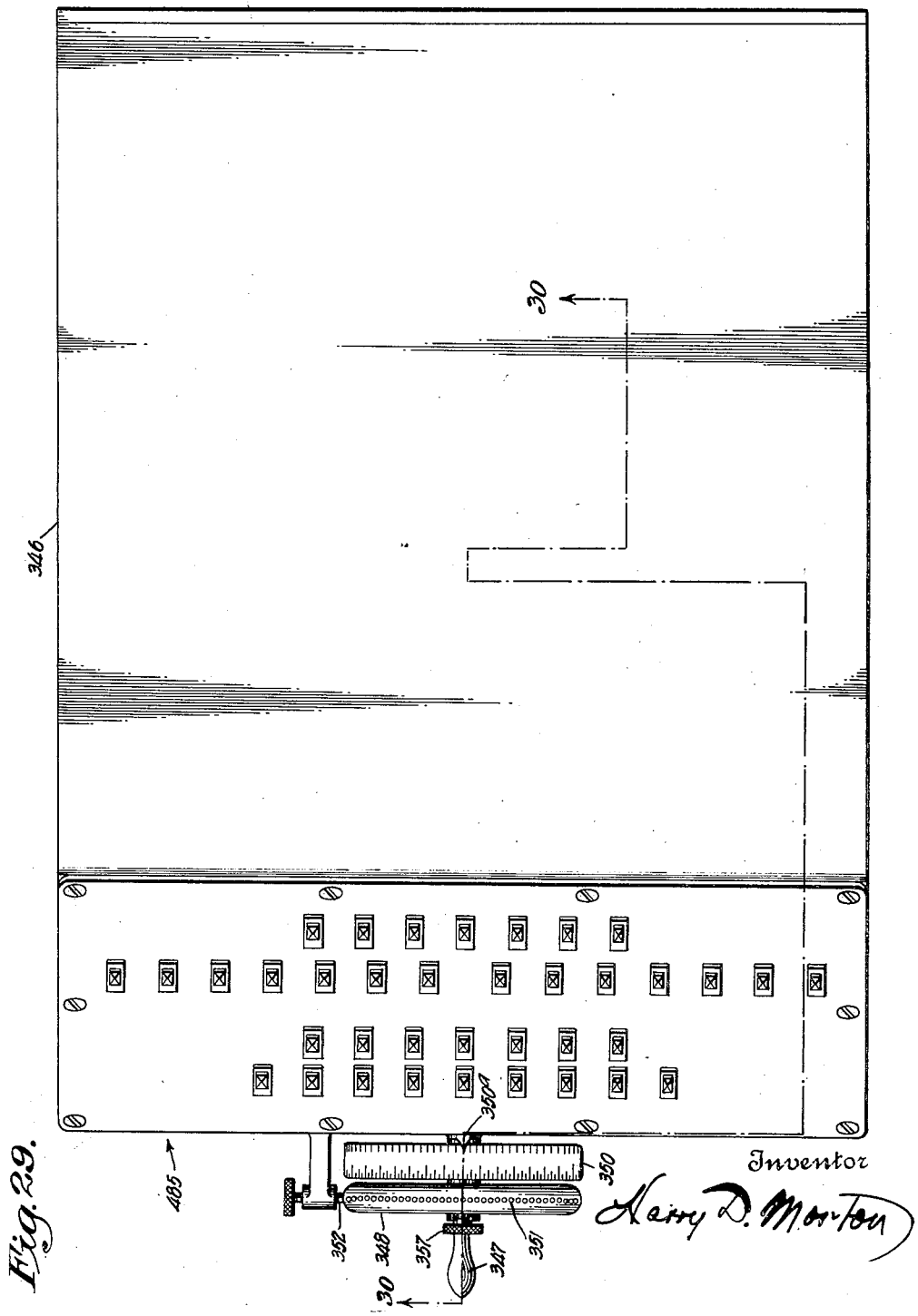

Aug. 28, 1934.  H. D. MORTON  1,971,828
SOUND PROJECTOR MOVING, ORIENTING, AND TILTING APPARATUS
Filed June 1, 1929   21 Sheets-Sheet 15
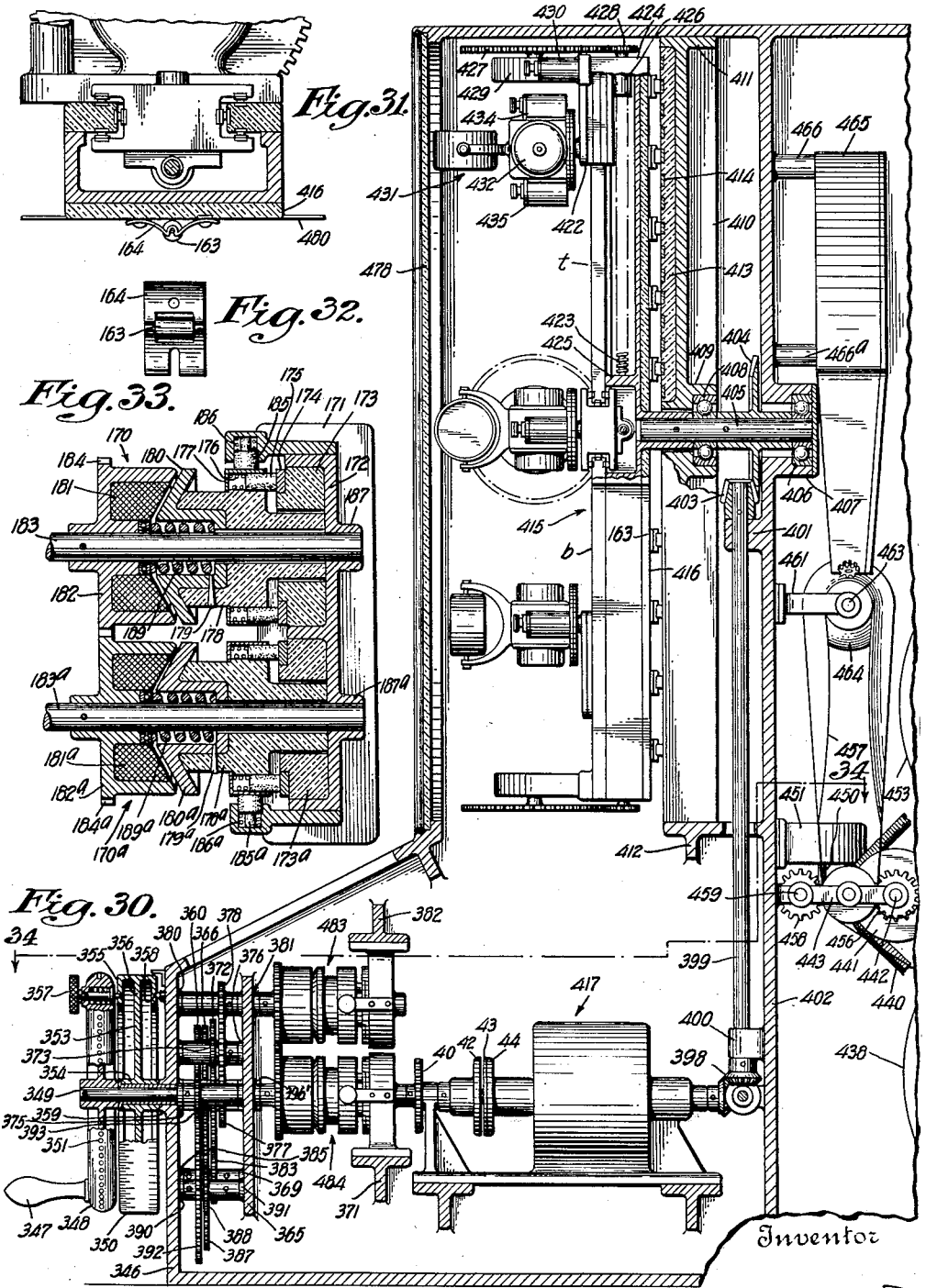
Inventor
Harry D. Morton

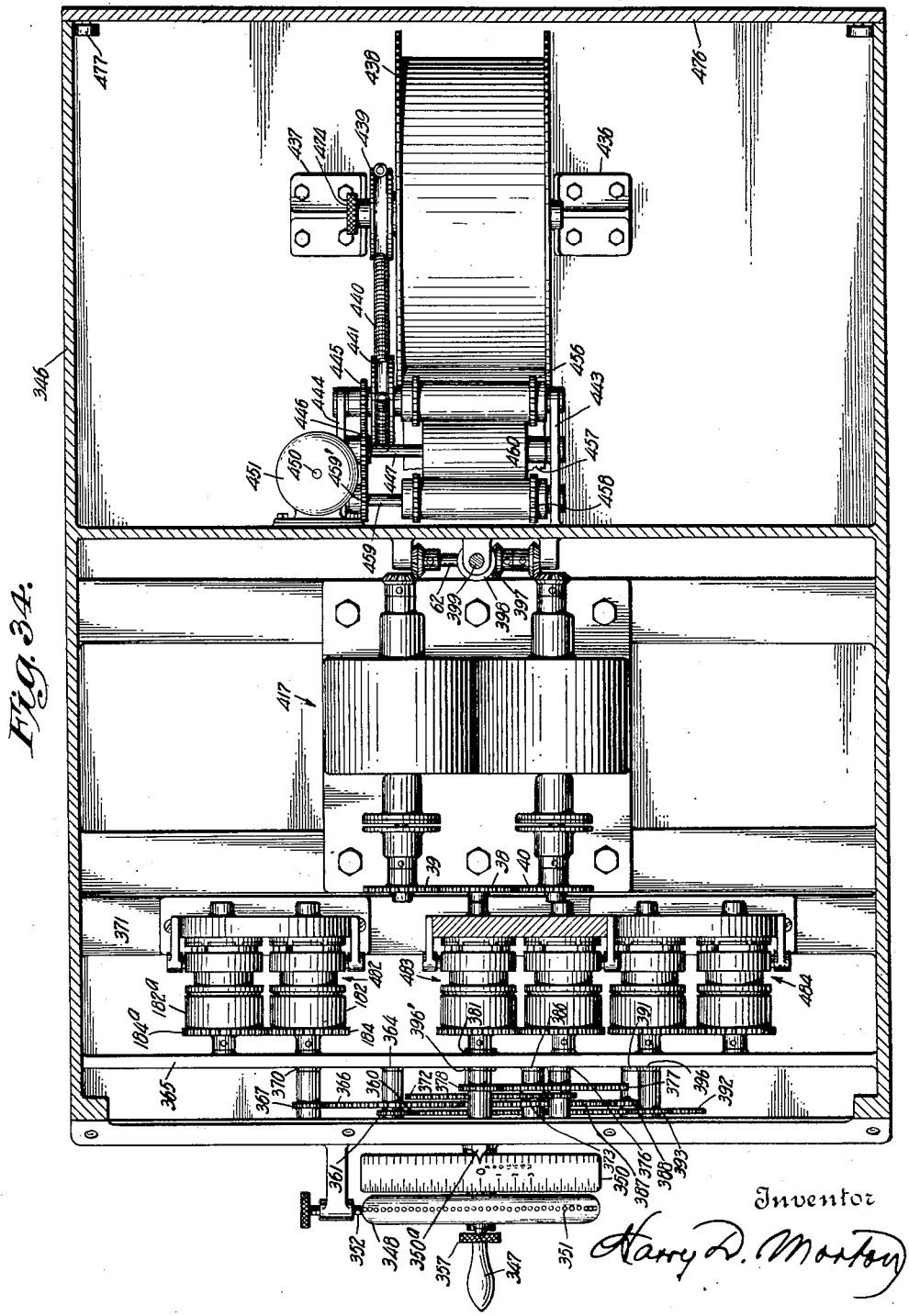

Aug. 28, 1934.    H. D. MORTON    1,971,828
SOUND PROJECTOR MOVING, ORIENTING, AND TILTING APPARATUS
Filed June 1, 1929    21 Sheets-Sheet 19

Inventor
Harry D. Morton

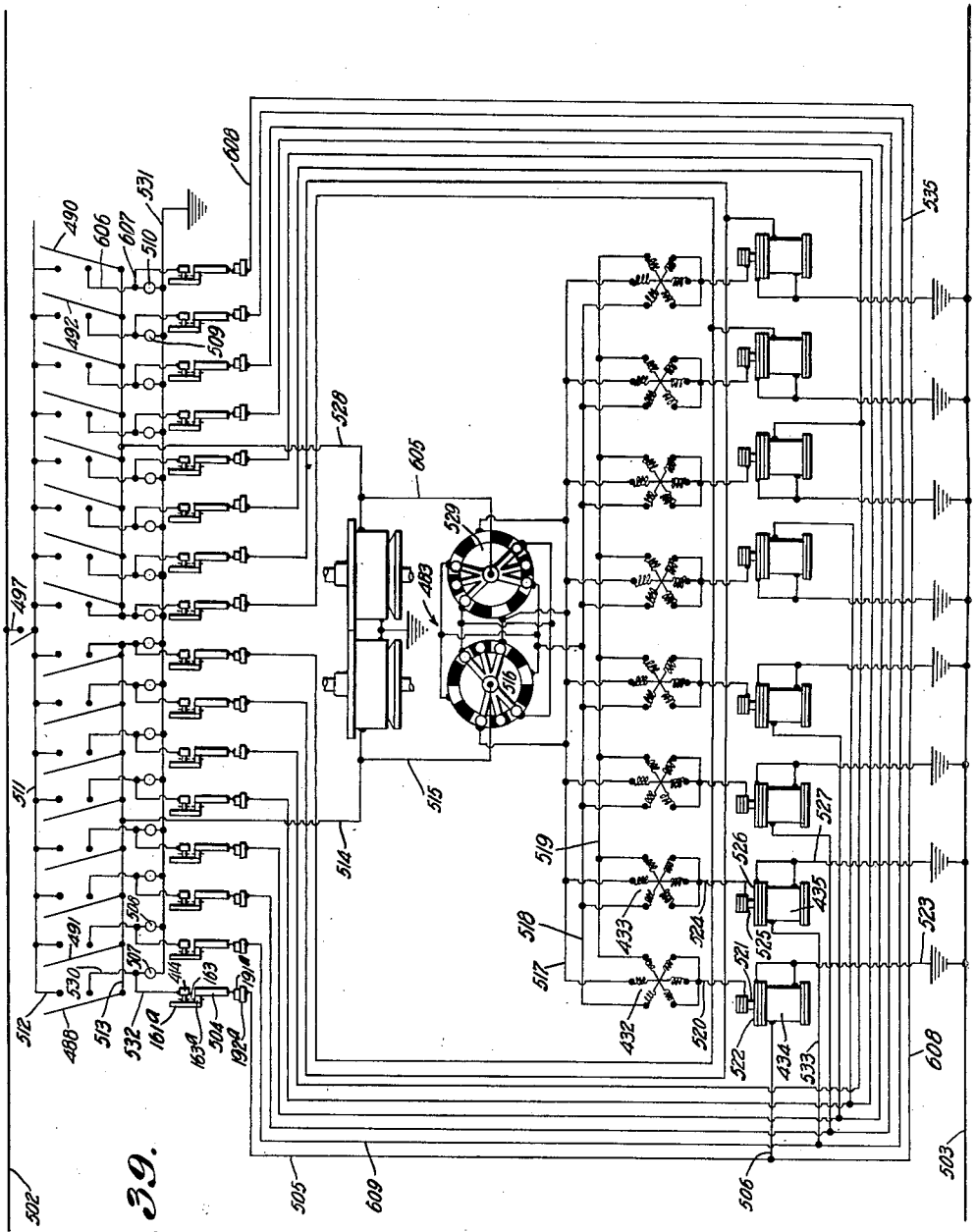

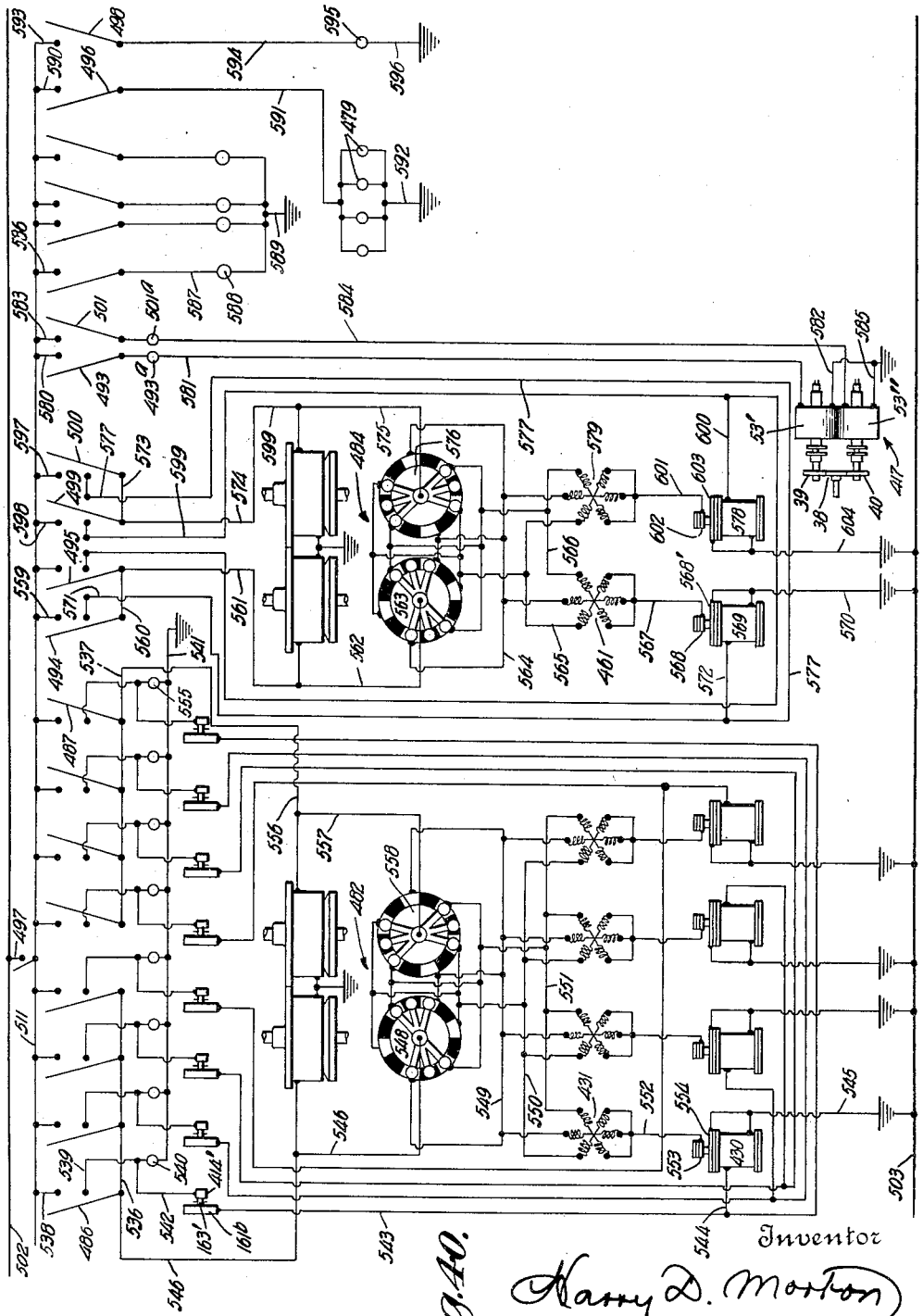

Patented Aug. 28, 1934

1,971,828

UNITED STATES PATENT OFFICE

1,971,828

SOUND-PROJECTOR MOVING, ORIENTING, AND TILTING APPARATUS

Harry D. Morton, New York, N. Y.

Application June 1, 1929, Serial No. 367,702

14 Claims. (Cl. 88—16.2)

This invention relates generally to the projecting of motion pictures and amplified synchronous sound effects; and more particularly to such projecting in connection with so-called "talking motion pictures."

The principal object of the invention is the provision of means for improving the illusory effect that the picture of an actor, for example, which is projected on a motion-picture screen, is actually speaking.

Another object is the provision of means for automatically moving the device from which is projected the reproduced and amplified sound, such as a voice, into juxtaposition, immediately behind the motion-picture screen, with the shadow depicting the lips of the person who is presumed to be speaking, in order to closely associate the source of sound projection with the picture.

A further object is the provision of means for automatically so rotating the sound-projecting device that the direction of the sound waves emanating therefrom will correspond with the actor's orientation with reference to the audience; and for tilting said device in accordance with the inclination of the actor's head, so that, directionally, the projected amplified sound waves will produce upon the audience substantially the same acoustic effect as though the actor were actually speaking.

A still further object is the provision of means for automatically controlling the mechanisms which move, rotate and tilt the sound-projecting device.

A still further object is the provision of such moving, orienting and tilting means which shall function to p operly locate and direct the sound-projector in advance of the appearance on the screen of the picture of the person presumed to be talking.

A still further object is the provision of means for readily and accurately co-ordinating, with the synchronous projection of pictures and sound effects, the operation of the said moving, orienting and tilting control means.

A still further object is the provision of means for conveniently and accurately forming a control-strip for the devices which govern the moving, orienting and tilting mechanisms.

A still further object is the provision of means for initially synchronizing the feeding of such a control-strip with the feeding of the picture-film and the operation of the sound-reproducing means, and for maintaining such synchronism.

In the process of recording pictures and accompanying sound effects, as at present carried out, the microphone or microphones which receive the sound waves are fixedly located so as to be as conveniently near the speaker as practicable, while at the same time being so placed as not to appear in the pictures. In projecting the reproduced and amplified sound waves comprising such a record, it is customary to place large loud-speakers in any convenient locations behind the motion-picture screen. These locations being fixed with reference to the screen, whereas the shadow representing the actor may appear anywhere thereupon, the source of sound projection fails to coincide with the location of the picture of the speaker, and the illusion that the speech issues from his lips is rendered impossible.

Moreover, the sound-projector is customarily so mounted as to directly face the audience and with its diaphragm vertically disposed, whereas the orientation of the actor with reference to the audience frequently changes, as does also the inclination of his head while talking. The acoustic effect upon an audience is markedly different as between speech delivered by an actor when directly facing it, when turned in profile to it, and when turned with his back toward it. Additionally, such acoustic effect varies with changes in the inclination of the speaker's head. For example, if the actor be speaking to someone directly above him, the effect upon the auditor is acoustically quite different from that produced when the speaker is addressing someone directly below him.

The natural voice issues from the lips of the speaker, rather than from a point remote therefrom; and the sound waves are not multi-directional in their maximum intensity, but are, in a considerable degree, uni-directional. In the absence of means for properly moving, orienting and tilting the sound-projector to coincide with the varying locations, orientations and angular positions of the shadow pictures from which more or less uni-directional sound waves are presumed to emanate, the present practice is to employ large sound-projectors of types which are purposely made multi-directional in the maximum intensity of their projected sound waves. The maximum intensity of the sound not being localized with reference to the shadow picture of the speaker, not being oriented to correspond with his position with reference to the audience, and not being directed in accordance with the inclination of his head, and being purposely projected multi-directionally instead of more or less uni-directionally, as it should be in order to simulate the natural voice, the illusion of a speaking motion-picture is lacking. An active imagination is therefore necessary in order to conceive of the picture as speaking. The effect is rather that of blatant and raucous speech which, while synchronizing with the movements of the actor's lips, is strikingly disassociated therefrom in an acoustic sense.

The following is a specification of the present preferred embodiment of apparatus comprising this invention, by which the foregoing objectionable features are overcome; but it will be understood that various modifications and changes may be made therein without departing from the spirit of the invention and without exceeding the scope of the appended claims.

The present invention embodies means, lacking in apparatus and methods now employed, for producing the illusion of a speaking motion-picture. Devices are provided for automatically moving the sound-projector into any desired location behind the screen, where it is juxtaposed to the shadow picture from which the speech is presumed to issue; for rotating the said projector to any desired angle in two planes, in order that its orientation may correspond with that of the actor with reference to the audience, and, further, in order that its inclinaion may correspond with the inclination of the actor's head; and for imparting to the projected sound waves the feature of more or less uni-directional maximum intensity which is characteristic of natural speech.

In carrying out the invention, mechanisms are provided for effecting these movements, and means also are provided for governing such mechanisms and for co-ordinating their operation to the projecting of the motion-pictures and the reproduced and amplified sound waves.

Mechanisms are provided for supporting one or more loud-speakers, for quickly moving the same to any desired location behind the screen; and for simultaneously effecting rotation thereof in either or both of two planes.

Electrical translating devices are employed for governing the aforesaid mechanisms; and means are provided for automatically controlling such electrical translating devices, so that the said sound-projecting means will have been properly located, oriented and tilted before a particular speech is begun.

Means also are provided for conveniently observing the extent and direction of movement required to bring any one of several loud-speakers to the proper location behind the screen and for positioning the same; and for forming a negative of a control-strip which will, with certainty, govern electric circuits to effect such movements.

There also are provided means for so forming the control-strip that it shall govern other electric circuits to effect the directing, from one loud-speaker to another, of electrical impulses emanating from a sound-amplifier.

Further means are provided for establishing and maintaining co-ordination of operation of the control-strip, the picture-film, and the sound-reproducing apparatus.

The invention will best be understood by reference to the accompanying drawings, wherein is illustrated the present preferred embodiment thereof, and in which Figure 1 is a front elevation of a mechanism for supporting, moving, orienting and tilting four sound-projectors, certain of the parts being broken away, and certain of the devices being omitted.

Figure 5 is a vertical section of an electro-magnetic clutch comprising one of the electrical translating devices employed in actuating several of the mechanisms.

Figure 6 is a left-hand end elevation of the device of Figure 5.

Figure 7 is a right-hand end elevation of the device of Figure 5.

Figure 8 is a top plan view, on a somewhat smaller scale, of a pair of the electro-magnetic clutches, illustrated singly in Figures 5, 6 and 7, and comprising a duplex magnetic clutch which is employed in actuating several of the mechanisms.

Figure 15:
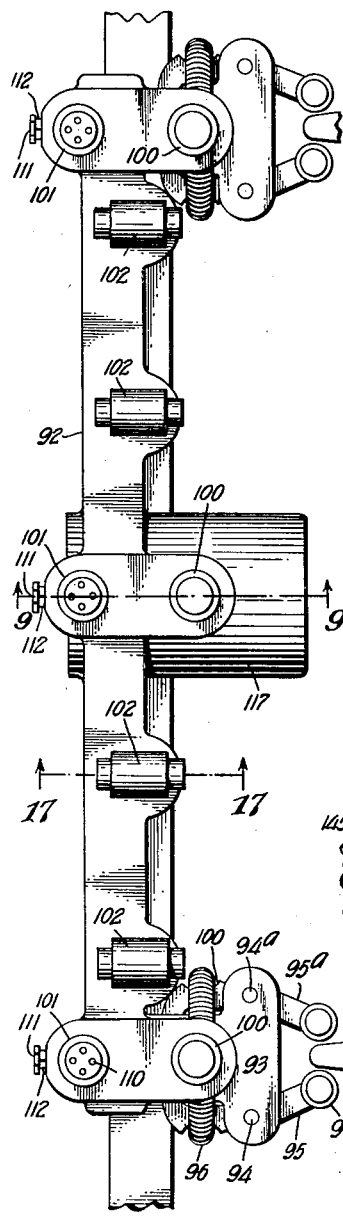

Figure 9 is a front elevation, on an enlarged scale, of a loud-speaker, together with mechanisms for rotating the same about two axes, and a carriage for supporting and moving said loud-speaker, certain of the parts of the loud-speaker being shown in elevation, certain others in section, and certain others being broken away; and said carriage being shown in section on the line 9—9 of Figure 15, looking in the direction indicated by the arrows.

Figure 10 is an illustration of two electro-magnetic switches carried by the loud-speaker and controlling the motors which actuate said loud-speaker, one of said switches being shown in front elevation and the other being shown in vertical section.

Figure 11 is a top plan view, on an enlarged scale, showing the electrical contacts and the supports therefor which comprise portions of said switches.

Figure 12 is a fragmentary detail, in side elevation, of a portion of one of the arms of a bracket supporting the loud-speaker shown in Figure 9, and illustrating means for conveying electrical impulses to an electro-magnetic device contained in said loud-speaker and actuating the diaphragm thereof.

Figure 13 is a fragmentary detail, in front elevation, of the devices shown in Figure 12.

Figure 14:
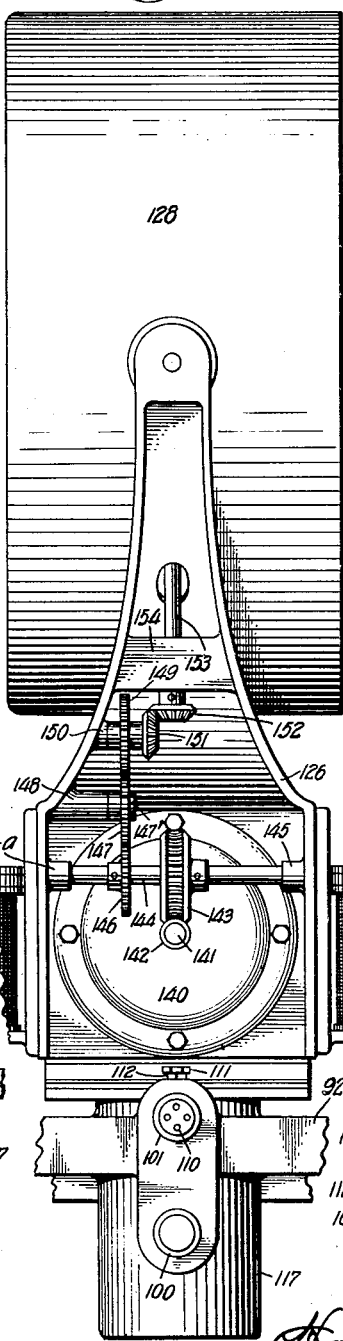

Figure 14 is a right-hand side elevation of the loud-speaker and bracket shown in Figure 9 and of a portion of the carriage supporting the same, the electro-magnetic switches mounted on the loud-speaker being shown as partially broken away.

Figure 15 is a side elevation of the carriage shown in section in Figure 9 and fragmentarily shown in side elevation in Figure 14, and of one of a pair of ways along which said table is adapted to be moved.

Figure 16:
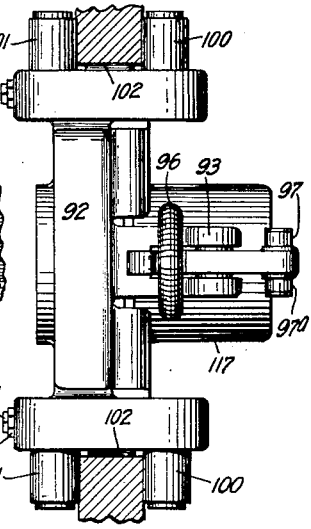

Figure 16 is a bottom plan view of the carriage shown in Figure 15, and a sectional view of the ways upon which said carriage is adapted to be moved.

Figure 17:
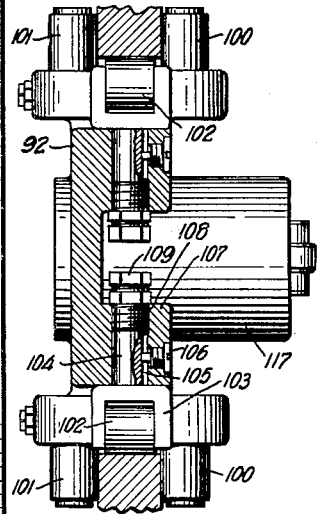

Figure 17 is a section of the carriage taken on the line 17—17 of Figure 15, looking in the direction indicated by the arrows; and a section of the two ways upon which said carriage is adapted to be moved.

Figure 18 is a top plan view of the loud-speaker and bracket shown in front elevation in Figure 9 and in side elevation in Figure 14, a portion of the speaker housing being shown as broken away in order to illustrate its megaphonic construction.

Figure 19 is a bottom plan view of the loud-speaker shown in front elevation in Figure 9, in side elevation in Figure 14, and in top plan view in Figure 18.

Figure 20 is a fragmentary sectional detail, taken on the line 20—20 of Figure 14, looking in the direction indicated by the arrows.

Figure 21 is a plan view of a portion of a photographic positive film, comprising one feature of the invention and employed to control electrical translating devices for governing the loud-speaker moving, orienting and tilting mechanisms.

Figure 22 is a vertical section of a control-box through which the control-strip of Figure 21 is adapted to be fed from one reel of a magazine (shown in front elevation) to another reel thereof, in the process of which feeding electric circuits are governed by light rays projected through said strip.

Figure 23:
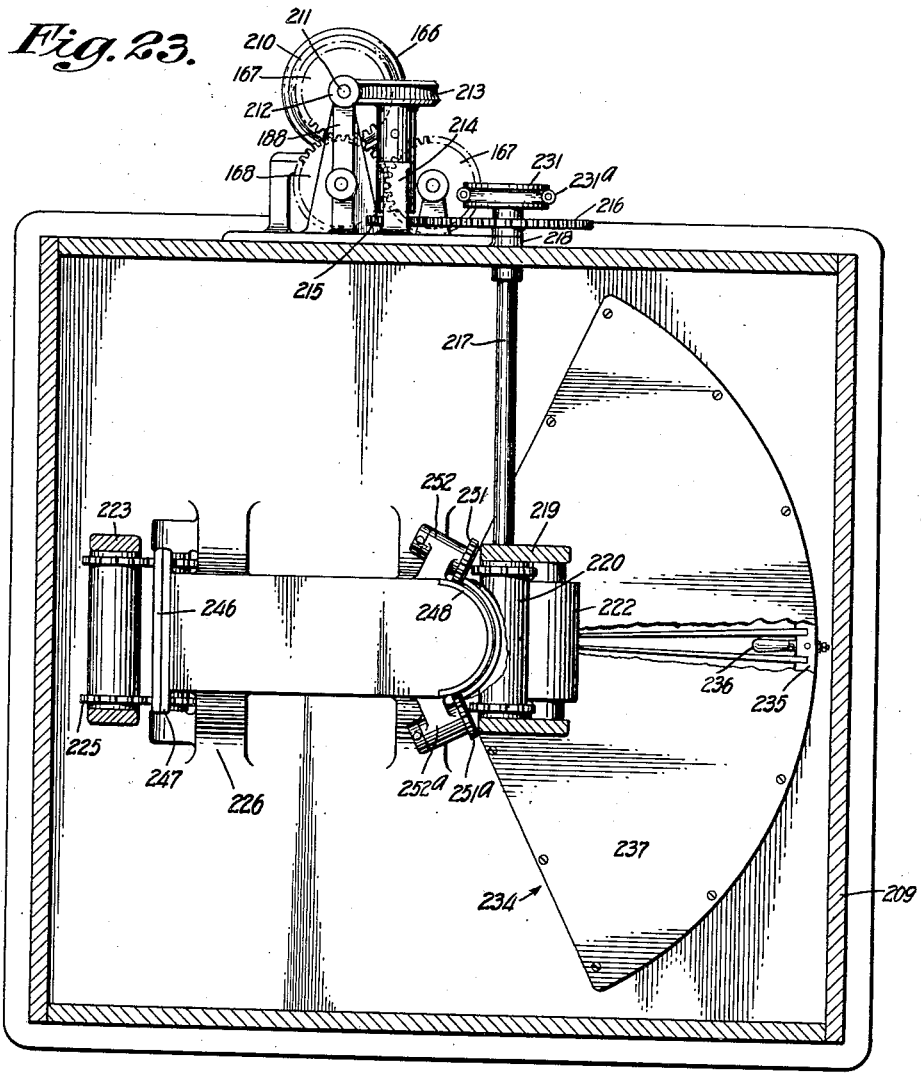

Figure 23 is a section on the line 23—23 of Figure 22, looking in the direction indicated by the arrows.

Figure 24:
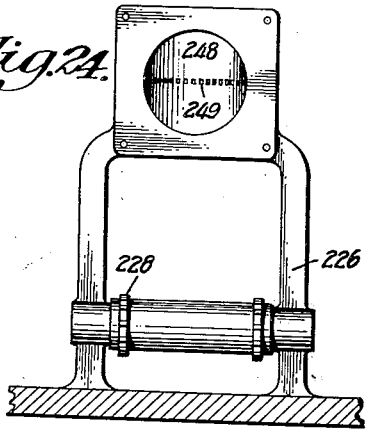

Figure 24 is a fragmentary detail, showing in end elevation one portion of the control-box illustrated in Figures 22 and 23.

Figure 25:
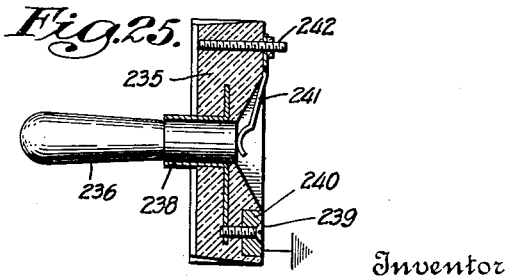

Figure 25 is an illustration, on an enlarged scale and partly in section and partly in elevation, of one of a number of photoelectric cells employed in the control-box shown in Figures 22 and 23; and also illustrating means for supporting and conveying current to said cell.

Figure 26:
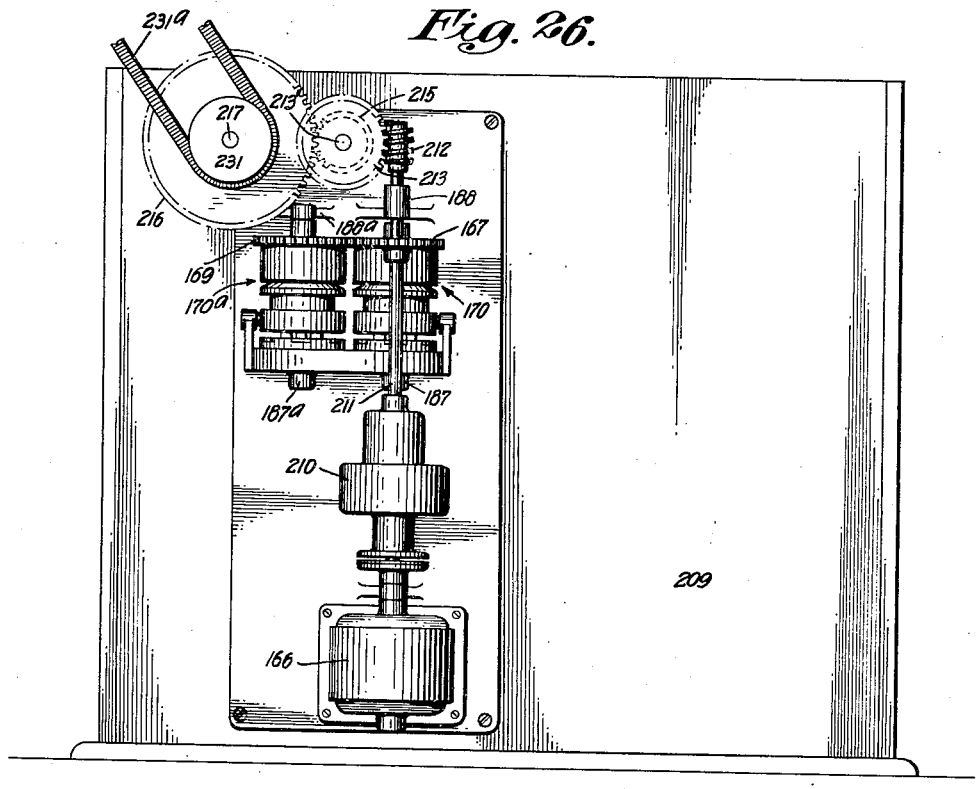

Figure 26 is a rear elevation of the control-box shown in Figures 22 and 23, the reel magazine being omitted.

Figure 27:
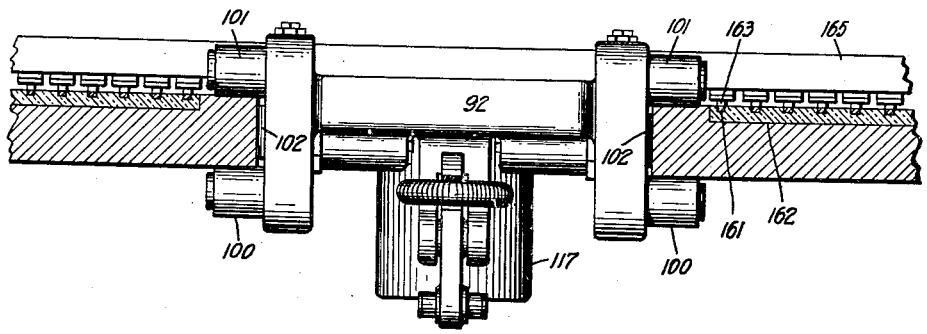

Figure 27 is a view similar to Figure 16, but illustrating means whereby current may be conveyed from the ways along which it moves to one of the carriages employed for supporting and moving the loud-speakers.

Figure 27A:
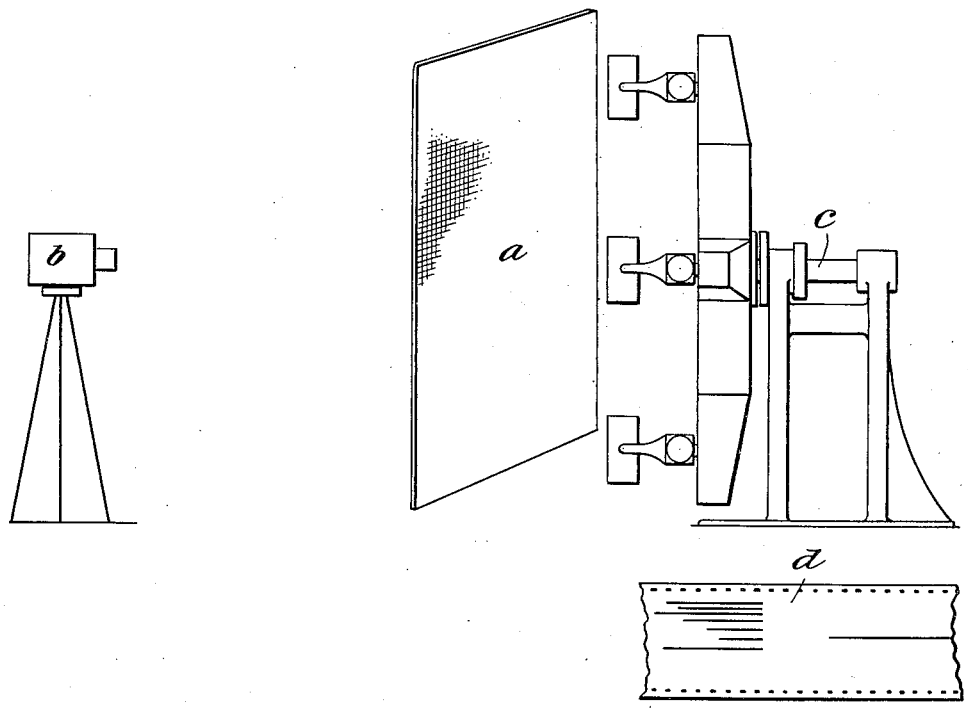

Fig. 27a illustrates diagrammatically a motion picture screen, a motion picture projector, a structure supporting a plurality of movable sound projectors and a portion of a control record for governing the movements of said sound projectors.

Figure 28:
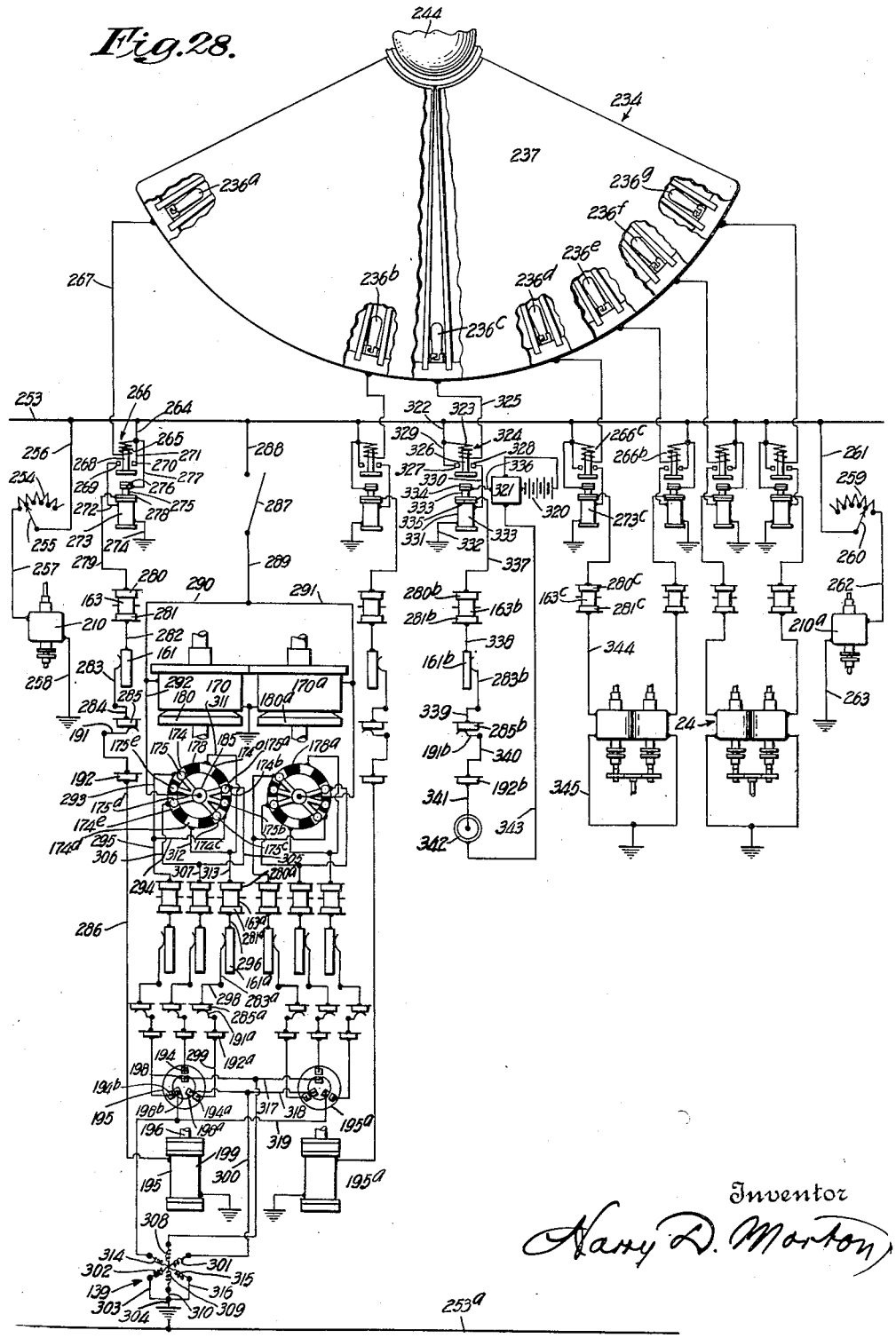

Figure 28 is a wiring diagram, illustrating schematically various electrical translating devices for governing the loud-speaker moving, orienting and tilting mechanisms, together with means whereby current is delivered to said devices.

Figure 29 is a top plan view of apparatus for facilitating the determination of the various locations and positions which the pictures of the actors will occupy and assume when the picture-frames are projected upon a full-size motion-picture screen—incorporated in which apparatus are manually-actuated miniature devices similar to those illustrated in Figures 1, 2, 3, 4, 9, 14, 15, 16, 17, 18 and 27, for carrying out the necessary moving, orienting and tilting operations with reference to a small-scale projection of the picture-frames into registration with the pictures of which frames are brought said miniature devices; and also incorporated in which apparatus and operating simultaneously with said miniature devices are mechanisms for feeding a photographic film and means for light-fogging the same in order to constitute it a negative from which may be made a positive control-strip provided with light-tracks for governing the electrical translating devices of the full-size apparatus.

Figure 30 is a framentary section on the line 30—30 of Figure 29, looking in the direction indicated by the arrows.

Figure 31 is a sectional detail, on an enlarged scale, taken through one of the arms of a miniature cruciform supporting structure, the dummy loud-speaker appurtenant to the carriage which is mounted on said arm being omitted.

Figure 32 is a top plan view of a spring-mounted trolley which may be employed as an electrical conductor in both the full-size and the miniature apparatus.

Figure 33 is a horizontal section of oppositely-rotating units of a duplex electrical distributor employed in both the full-size and the miniature apparatus.

Figure 34 is a section on the line 34—34 of Figure 30, looking in the direction indicated by the arrows.

Figure 35:
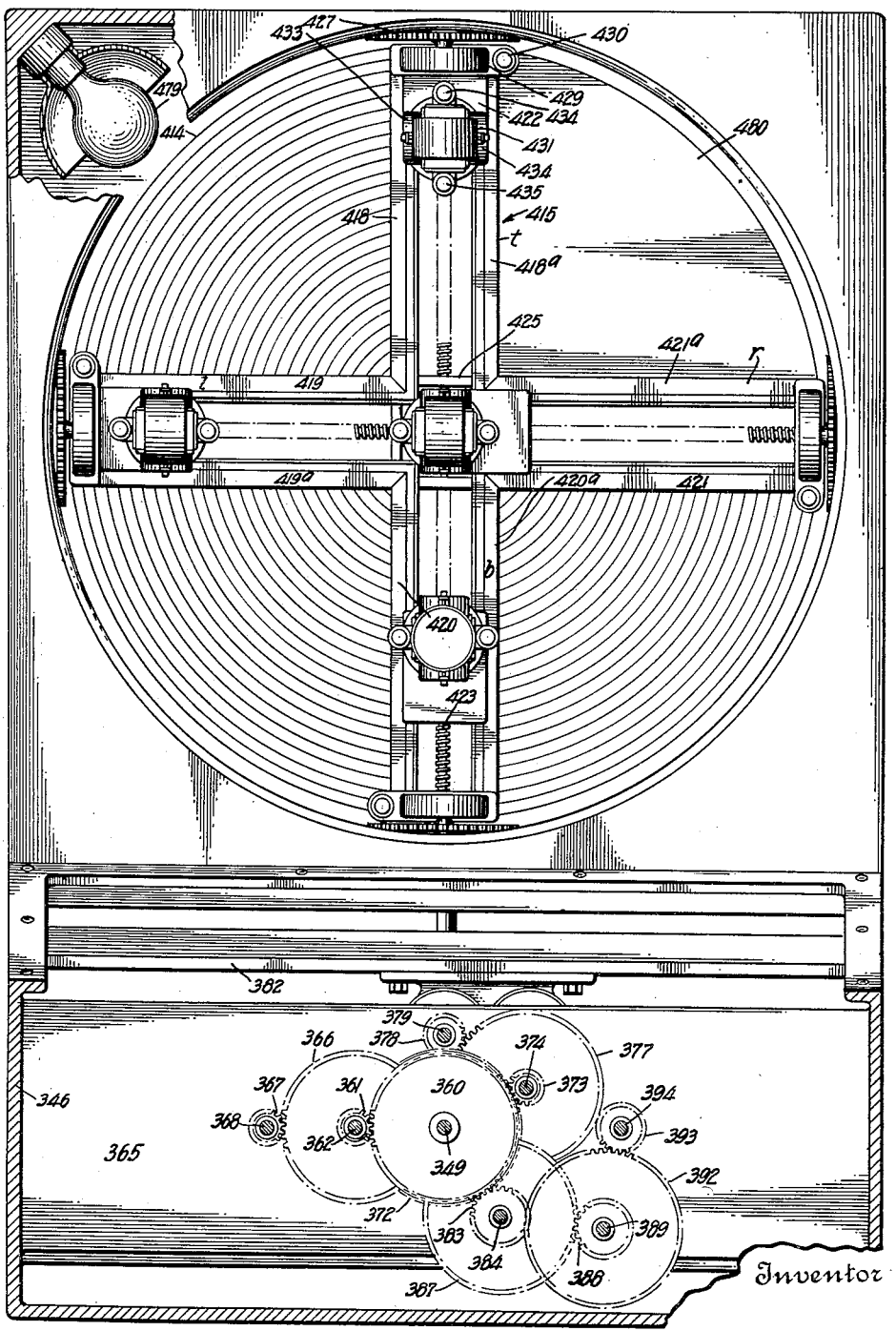

Figure 35 is a section on the line 35—35 of Figure 30, looking in the direction indicated by the arrows, certain of the parts being shown as broken away.

Figure 36:
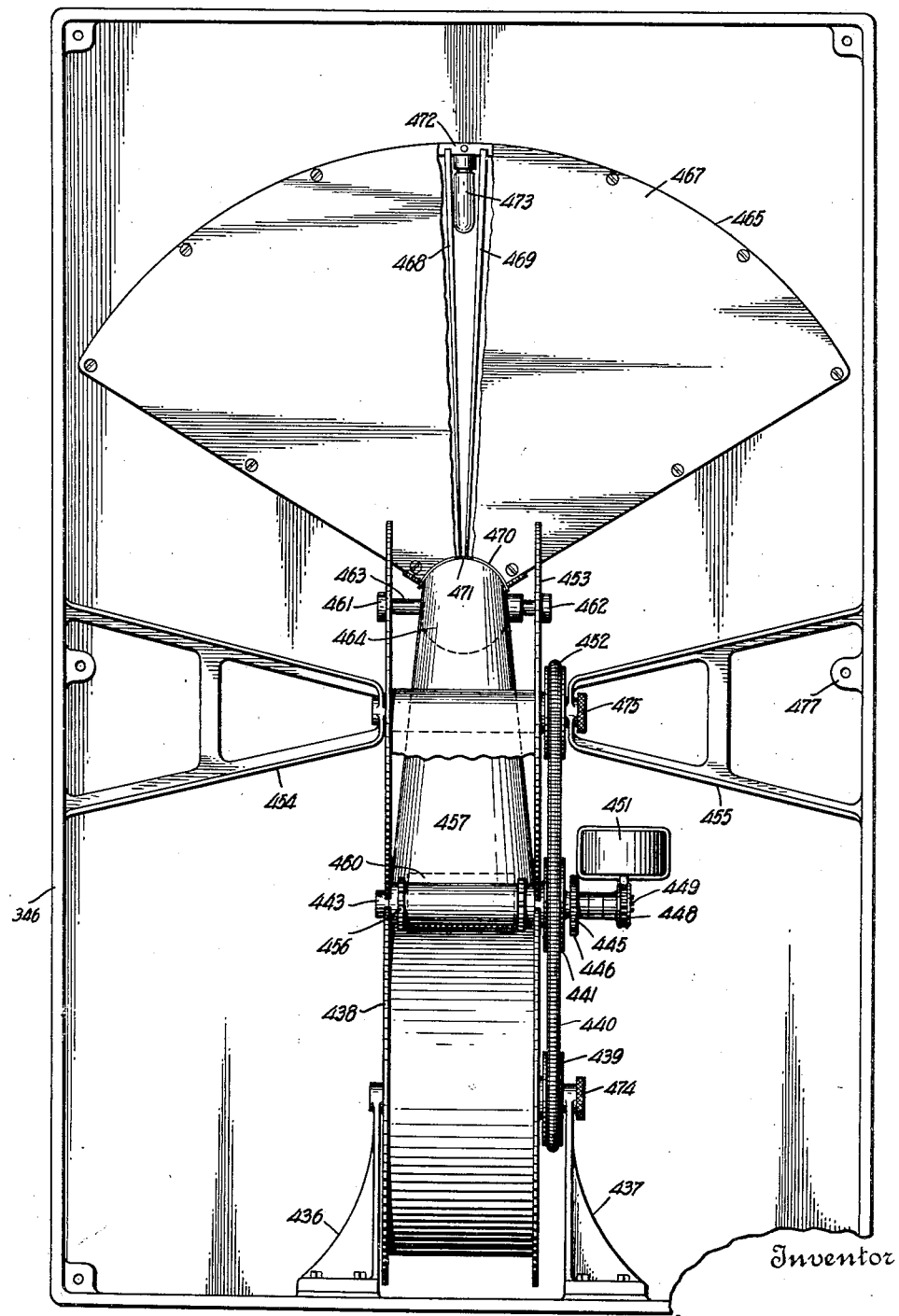

Figure 36 is a rear elevation of the apparatus shown in Figures 29, 30, 34 and 35, with the cover of said apparatus removed and with one of the parts partially broken away.

Figure 37:
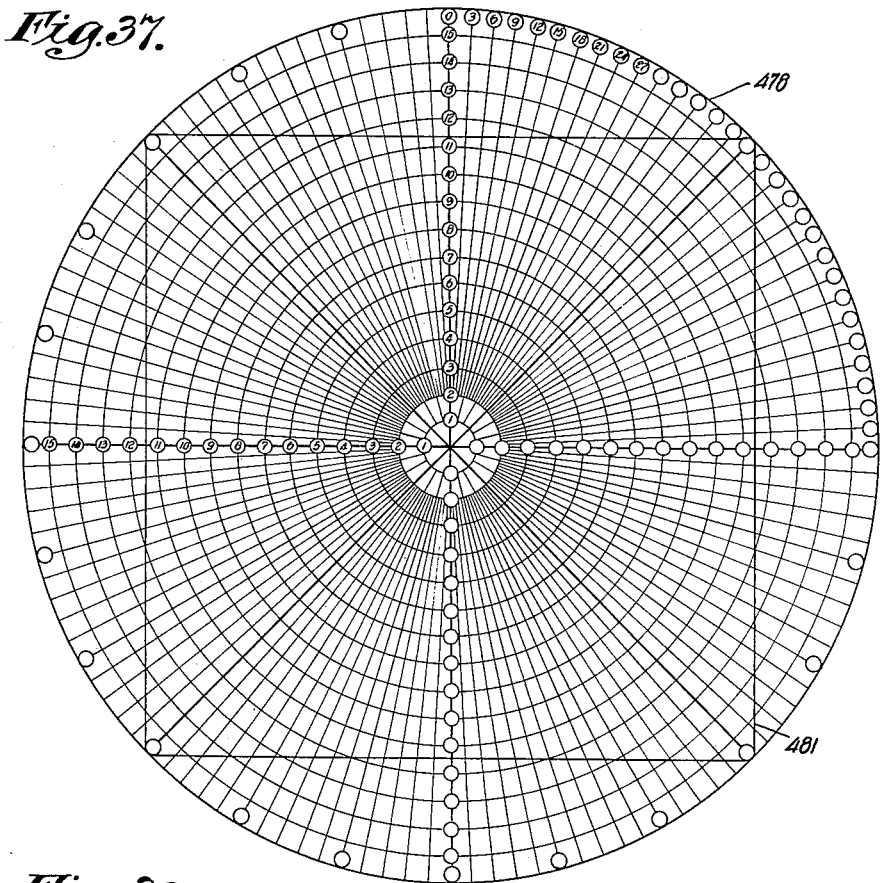

Figure 37 is a plan view of a calibrated window installed in the apparatus of Figures 29, 30, 34 and 35, which window is constructed to serve also as a screen for the projection thereupon of a miniature reproduction of the picture-frames which are to be observed for the purpose of determining the loud-speaker moving, orienting and tilting requirements.

Figure 38:
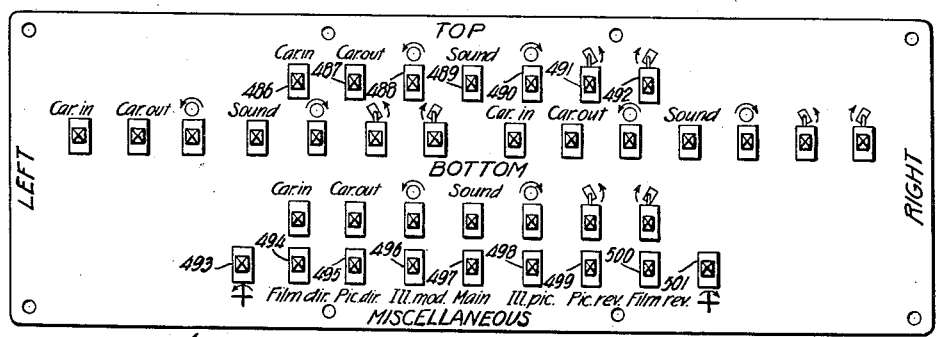

Figure 38 is a top plan view of a switchboard installed on the apparatus of Figures 29, 30, 34 and 35 and employed for manually controlling the various electrical translating devices incorporated in said apparatus.

Figure 39 is a wiring diagram, schematically illustrating electrical translating devices employed in manually governing the rotation, about two axes and in two directions, of four dummy loud-speakers comprising a portion of the miniature apparatus shown in Figures 30 and 35, in order that a negative-film for forming the control-strip for the full-size apparatus may be correctly made in accordance with the requirements of the reproduced pictures and sound effects.

Figure 40 is a further wiring diagram, schematically illustrating other electrical translating devices employed in manually governing the travel of four carriages comprising other portions of said miniature apparatus; also schematically illustrating other electrical translating devices employed in manually governing the feeding of a negative-film made in said miniature apparatus and the feeding of a picture-and-sound-track film; also schematically illustrating other electrical translating devices employed in manually governing the rotation of a cruciform supporting structure comprising a further portion of said miniature apparatus; also illustrating means for forming on said negative-film light-fogged paths, the positive of which will control the delivery of current to the diaphragm-actuating device of any one of four loud-speakers of the full-size apparatus; and also illustrating means for illuminating the miniature apparatus and the picture-and-sound-track film.

Like reference characters indicate like parts throughout the drawings.

Referring to the drawings (Figs. 1 and 2): a bed-plate 1 is adapted to be attached to the floor of a stage immediately behind a perforated motion-picture projection screen. Integral with this base are two stanchions (Fig. 2), 2 and 2a, provided at their upper ends, respectively, with bearing portions 3 and 3a. Rotatably mounted in these bearing portions, and preferably supported on annular ball- or roller-bearings (not shown), is a tubular shaft 4. Integral with stanchion 2 and bearing portion 3 is a flange 5, mounted on which is a disk 6 of insulating material, the purpose of which hereinafter will be explained. Integral with or attached to tubular shaft 4 is a flange 7, secured to which is an annular portion 8 of a cruciform supporting structure, designated generally by the reference numeral 9. Mounted on the opposite face of flange 7 is a disk 7' of insulating material, the purpose of which hereinafter will be explained. Also attached to tubular shaft 4 is a pulley 10, driven by a belt 11, running over a driving pulley 12, attached to a shaft 13, supported in bearings 14 and 15 and also having attached thereto a worm-wheel 16, driven by a worm (not shown) which is attached to a shaft 17, rotatably mounted in brackets such as 18. Also attached to this shaft 17 are two bevel gears such as 19, each of which is adapted to be driven by another bevel gear, such as 20, mounted on a shaft (not shown), supported in a bracket such as 21. Attached to the opposite end of each of these latter shafts is another bevel gear, such as 22, adapted to be driven by another bevel gear, such as 23, attached to a shaft (not shown), one or other of which latter shafts is driven (through a magnetic clutch designated generally by the reference numeral 24) by a synchronous or other constant-speed motor, 25, mounted on stanchion 2a.

Rotatably mounted in tubular shaft 4 and supported therein by annular ball bearings, such as 26 (Fig. 3), is a shaft 27, attached to one end of which is a bevel gear 28 (Fig. 2), meshing with a driving bevel gear 29, attached to the armature shaft of a synchronous or other constant-speed motor 30, also mounted on stanchion 2a.

Figure 3:
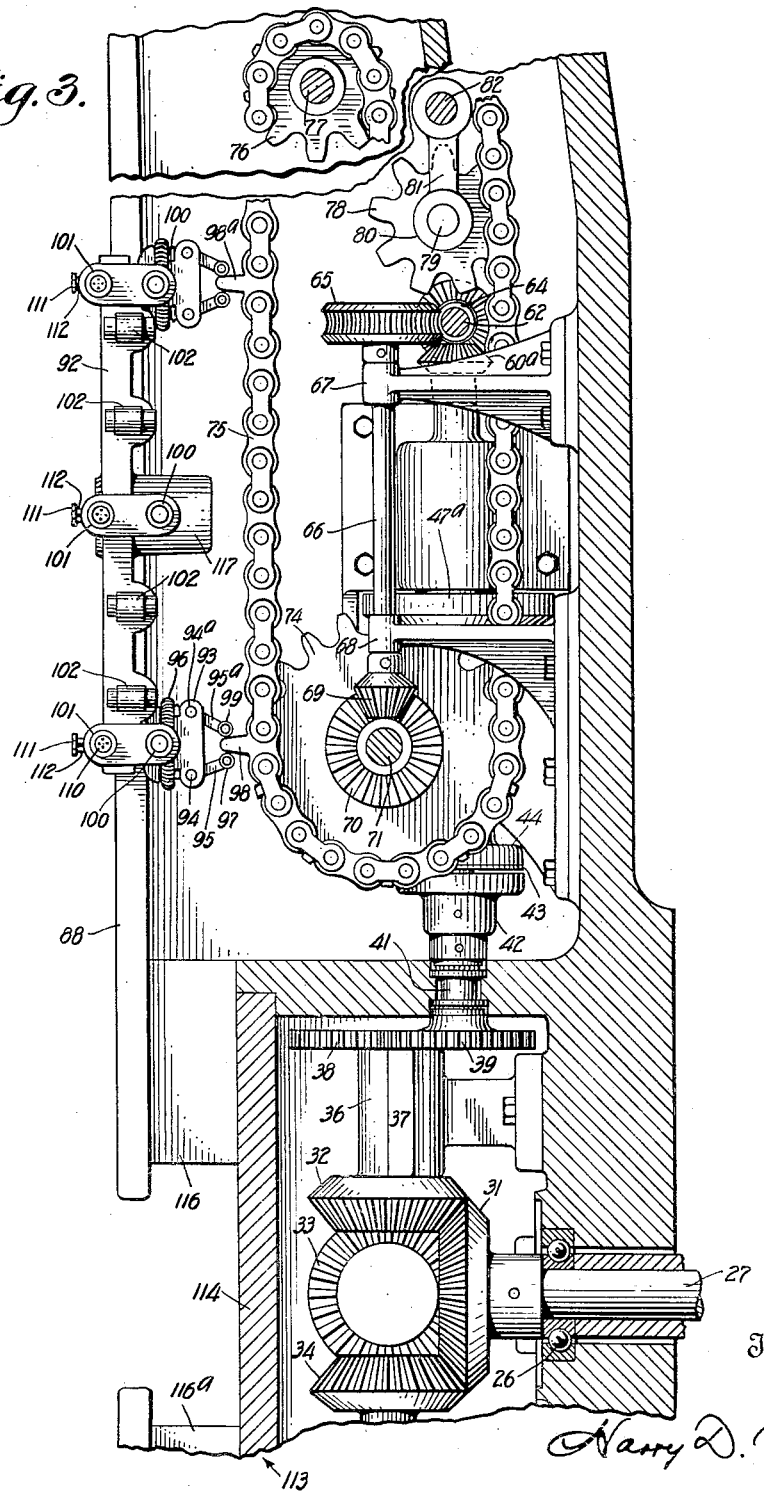
Figure 3 is a fragmentary sectional detail, with portions thereof broken away and with certain of the parts omitted, and on an enlarged scale, taken on the line 3—3 of Figure 1, looking in the direction indicated by the arrows.
Figure 4:
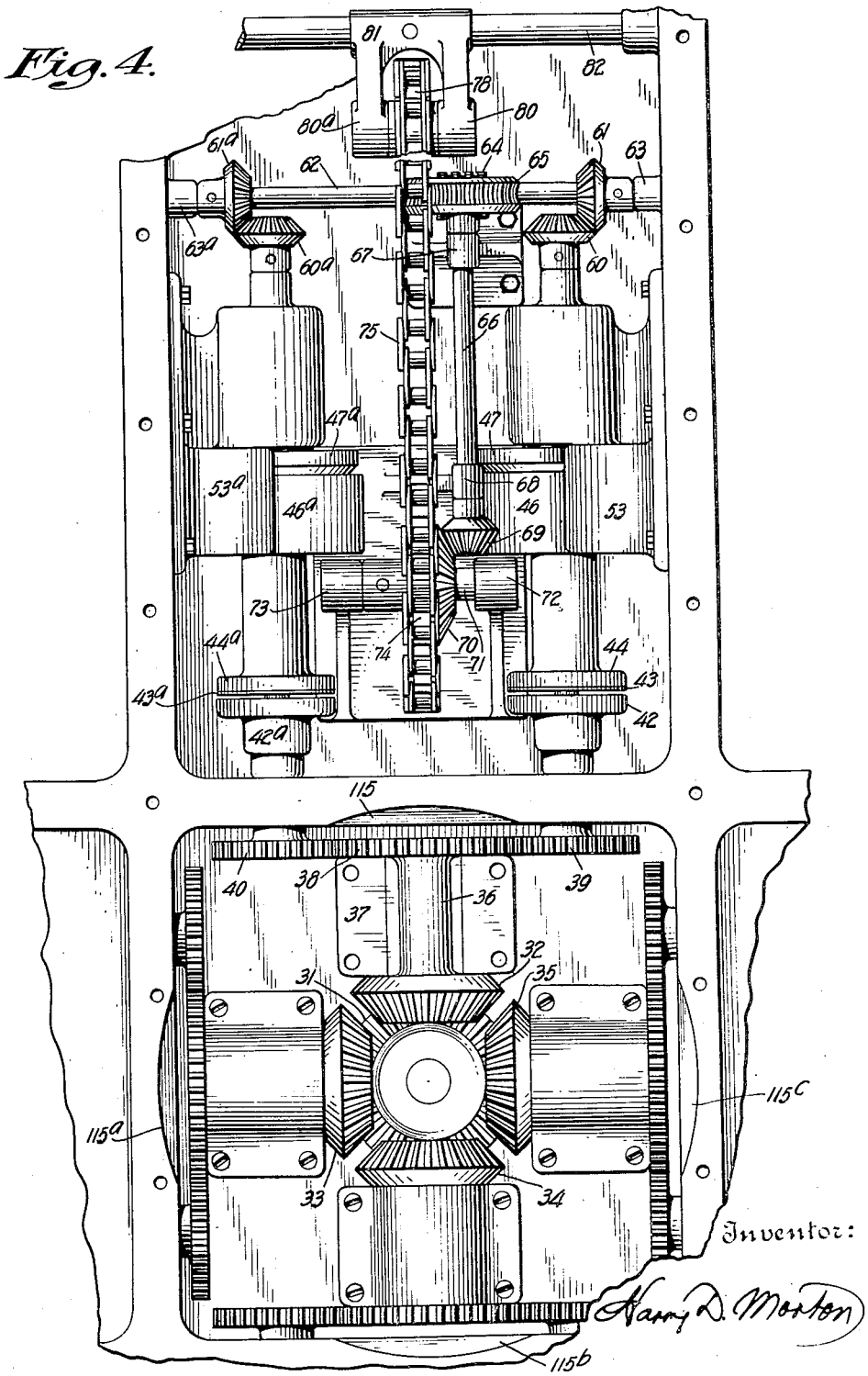
Figure 4 is a fragmentary detail, also on an enlarged scale, and taken on the line 4—4 of Figure 2, looking in the direction indicated by the arrows, said view comprising, in general, a front elevation of most of the parts shown in Figure 3.

Referring to Figs. 3 and 4: attached to the opposite end of shaft 27 is a bevel gear 31, driving four bevel gears 32, 33, 34 and 35, each of which latter gears is attached to a shaft such as 36, supported in a bearing such as 37, attached to the floor of the cruciform supporting structure 9. On the opposite end of each shaft such as 36 is a spur gear such as 38, driving two spur gears such as 39 and 40 (Figs. 3 and 4), each of said driven spur gears being attached to a shaft such as 41 (Fig. 3), to which is also attached a driving friction disk element 42 (Figs. 3, 4, 5, 6 and 8), into frictional driving contact with which a pad 43, attached to a driven disk element 44, is adapted to be brought as a result of movement of said driven disk element.

Referring to Fig. 5, driven friction disk element 44 is provided with a shank portion 45, rotatably supported in the bore of a magnet frame 46 and in the bore of a magnet armature 47. A shaft such as 41 is rotatably supported in a bracket portion 48 of this magnetic clutch assembly, and also in the bore of the shank portion 45 of the driven friction disk element 44. The hub portion of the driving disk element 42 is provided with an annular recess, installed in which recess is a ball-thrust bearing 49. The hub portion of driven friction disk element 44 is provided with a like annular recess, installed in which is a similar ball-thrust bearing 50. An extension coil spring 51 surrounds the shaft 41, and abuts against the ball-thrust bearings 49 and 50, thus normally separating the adjacent surfaces of the friction disks.

The magnet frame 46 is attached, as by screws such as 52, to the bore of a housing 53, and is provided with a winding 54. The armature 47 is provided with a shank portion 55, longitudinally movable in the bore of the housing 53, but restrained from rotation therein by a key 56, engaging splines in the shank portion 55 and in the wall defining the bore of said housing. Installed in the bore of armature 47, between the inner surface of the end wall of the shank portion 55 thereof and the extreme right-hand end of the shank portion 45 of the driven friction disk element 44, is a ball-thrust bearing 57. The right-hand end (as viewed in Fig. 5) of the shank portion 45 of the driven friction disk element 44 is bored to receive a driven shaft 58. The inner end of this shaft and the wall defining the said bore of the shank portion 45 are splined to receive a key 59, which is preferably attached to the shaft. Sufficient clearance is provided between the key and the spline in the wall of the shank portion 45 to permit of longitudinal movement of said shank portion with reference to the key and to the bore of the magnet frame 46, while at the same time providing means whereby the driven friction disk element 44 may rotate the driven shaft 58.

Upon the energization of the magnet winding 54, the armature 47 is attracted and moved to the left (as viewed in Fig. 5), thus bringing the pad 43 into frictional driving contact with the adjacent face of the disk portion of the driving friction disk element 42, and effecting rotation of the shaft 58. The driving friction disk element 42 may be made of aluminum and the pad 43 of cork, which two materials have a high coefficient of friction. The driven friction disk element 44 is preferably made of good bearing material such as phosphor bronze, between which and the steel of the magnet frame 46 and the armature 47 the coefficient of friction is low.

Referring now to Figs. 4 and 8, wherein are illustrated two of the magnetic clutch assemblies just described as shown singly in Figs. 5, 6 and 7: the corresponding parts of this duplex clutch assembly are designated by the same reference numerals, but with the addition, as applying to the parts of one of the units, of the reference letter a. The driven shafts (such as 58 of Figs. 5 and 7) carry respectively bevel gears 60 and 60a, bevel gear 60 driving another bevel gear 61, and bevel gear 60a driving another bevel gear 61a. These driven bevel gears 61 and 61a are attached to a shaft 62, rotatably supported in brackets 63 and 63a, said shaft 62 also having attached thereto a worm 64. While, as indicated by the arrows in Fig. 8, the driving bevel gears 60 and 60a rotate in the same direction, the opposite disposition of the driven bevel gears 61 and 61a on the shaft 62 results in the rotation in one direction or the other (depending upon which of the magnet windings is energized) of the shaft 62 and the worm 64.

Figure 2:
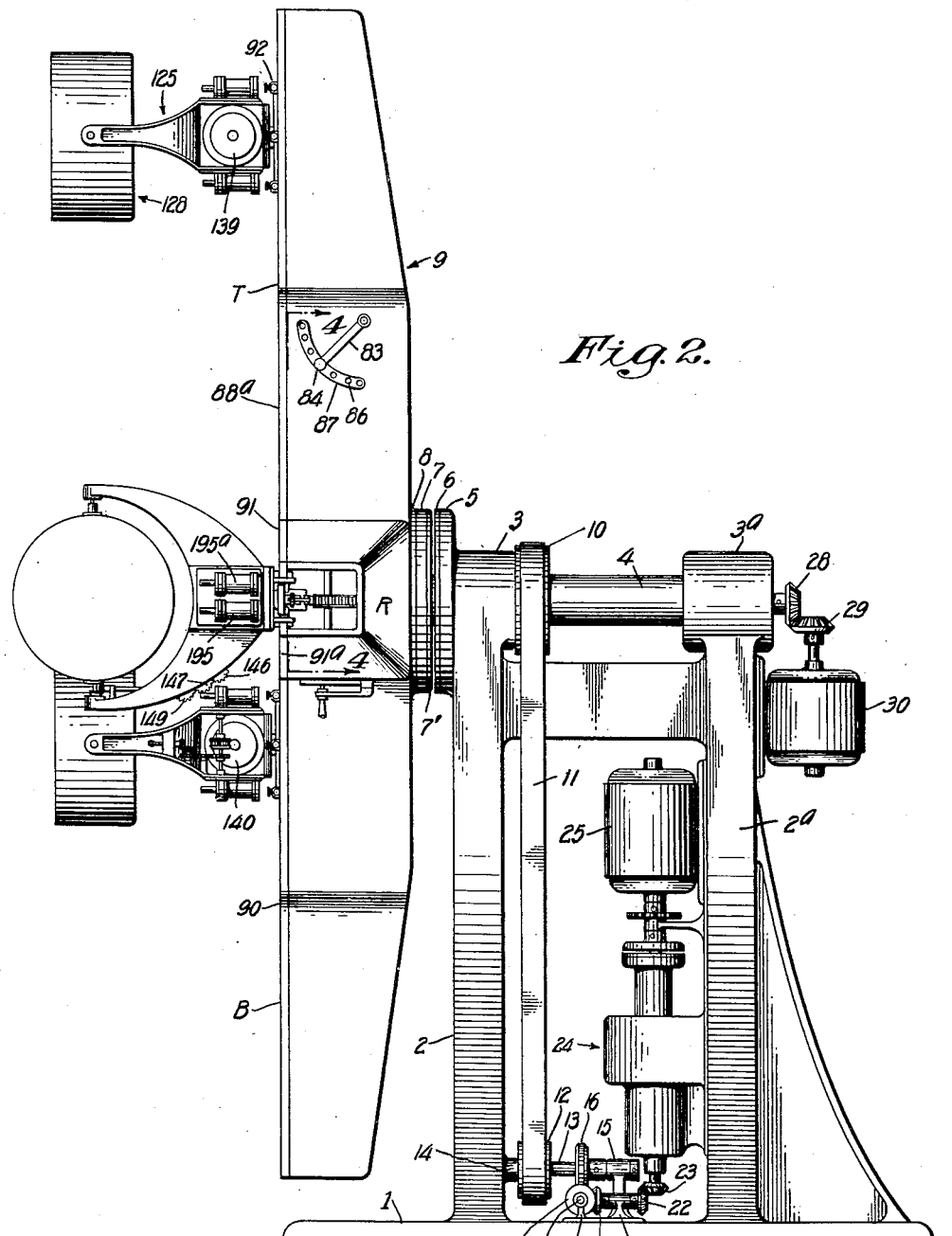
Figure 2 is a right-hand side elevation of the mechanism shown in Figure 1.

In further reference to Fig. 2, the magnetic clutch designated generally by the reference numeral 24 is of the duplex type illustrated in Fig. 8, the worm (not shown) corresponding to worm 64 of said Fig. 8. The cruciform supporting structure (designated generally by the reference numeral 9) may thus be rotated in one direction or the other, in the manner just described with relation to Fig. 8, depending upon which of the windings of the duplex magnetic clutch assembly is energized. It is contemplated that, in the operation of the apparatus, the constant-speed motor 25 shall rotate continuously, the rotation of the cruciform supporting structure in one direction or the other being effected whenever one or other of the clutch magnet windings is energized.

Figure 1:
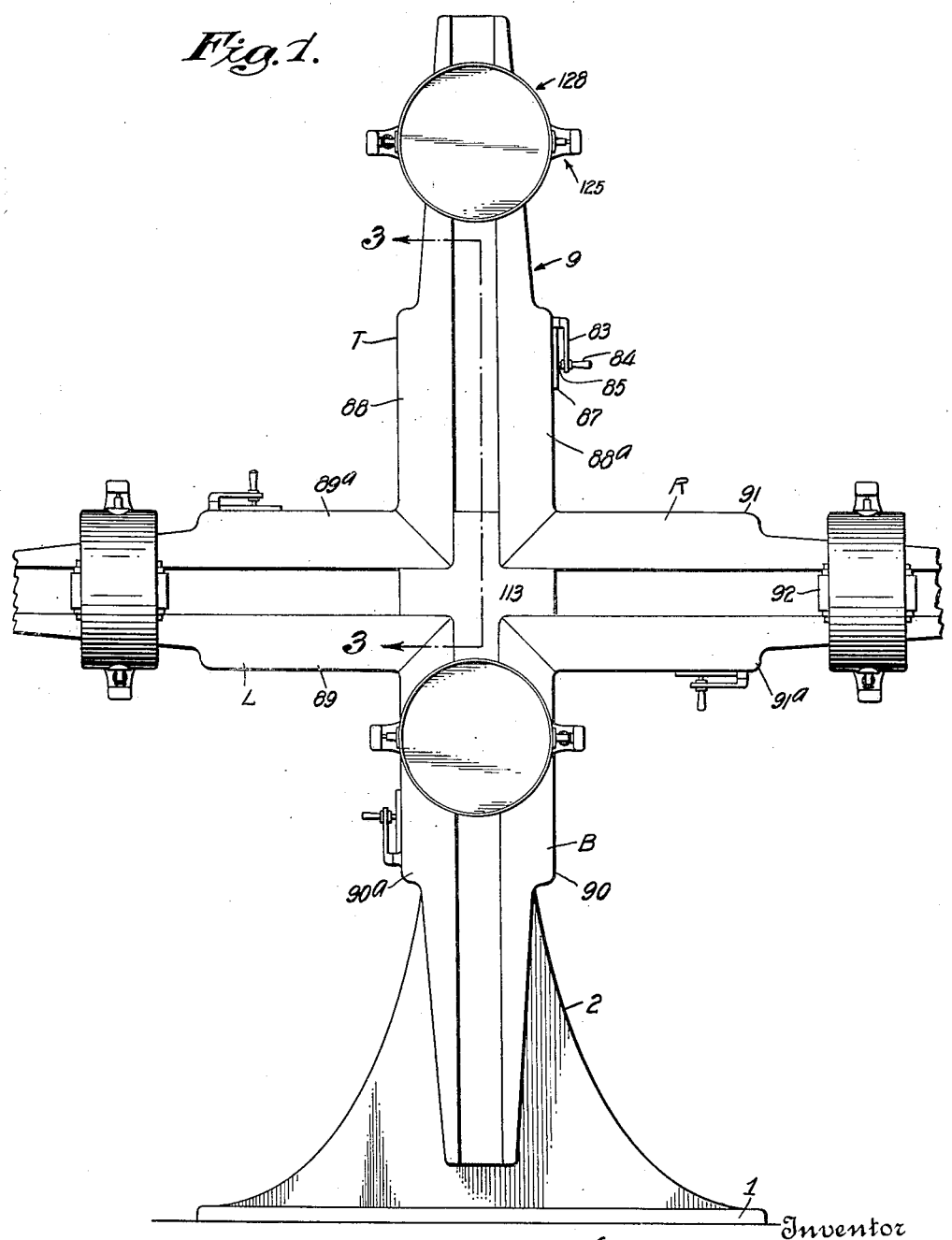

As illustrated in Figs. 3 and 4, the worm 64 drives a worm-wheel 65, mounted on a shaft 66, rotatably supported in brackets 67 and 68, and having attached to its opposite end a bevel gear 69, driving a bevel gear 70, attached to a shaft 71, rotatably supported in brackets 72 and 73. Also attached to this shaft 71 is a sprocket-wheel 74, adapted to drive (in one direction or the other, depending upon whether the winding in magnet frame 46 or that in magnet frame 46a is energized) a sprocket-chain 75, supported by an idler sprocket-wheel 76 (Fig. 3), attached to a shaft 77, rotatably supported in bearings (not shown) in the opposite side walls of an arm such as T of the cruciform supporting structure 9 (Figs. 1 and 2). In order to insure adjustment of the sprocket-chain 75, a second idler sprocket-wheel 78 is provided, this latter wheel being attached to a shaft 79, rotatably supported in bearings 80 and 80a of the arms of a yoke 81, the hub of which yoke is attached to a shaft 82, rotatably supported in bearings in the opposite side walls of the arm of the cruciform supporting structure 9. One end of the shaft 82 projects through one of said side walls, and attached to this projecting end is a hub portion of a lever 83 (Figs. 1 and 2), provided with a handle 84, in which is mounted a spring detent 85, adapted to engage depressions such as 86 formed in a sector 87, attached to the outer surface of such side wall. Movement of the lever 83 rotates the shaft 82 and the yoke 81, thereby swinging sprocket-wheel 78, and thus taking up any slack in the sprocket-chain resulting from its having stretched.

Referring again to Figs. 1 and 2, the four arms of the cruciform supporting structure 9 are designated respectively by the reference letters T, L, R and B, denoting "Top," "Left," "Right" and "Bottom," as such arms appear in said Figs. 1 and 2. Each of these four arms is provided with a duplex magnetic clutch and a gear train, sprocket-wheel and sprocket-chain, adapted to be driven thereby, such as have just been described as being appurtenant to arm T. The bevel gear 31 (Figs. 3 and 4) affords a common driving means for the aforesaid mechanisms of each of the four arms. As is illustrated in Fig. 4, the drive for arm L is through bevel gear 33; that for arm B through bevel gear 34; and that for arm R through bevel gear 35. It is contemplated that motor 30 (Fig. 2) shall continuously rotate at synchronous speed during the operation of the apparatus, thereby constantly driving bevel gears 32, 33, 34 and 35 (Figs. 3 and 4), their spur gears such as 38, 39 and 40, and their driving friction disk elements, such as 42 and 42a (Fig. 4). By the energization of the winding of one or other of the units of its duplex magnetic clutch, a driving connection may at any time be effected with the gear train installed in any of the four arms of the cruciform supporting structure, and with the sprocket-wheel and the sprocket-chain driven by said gear train.

The arms T, L, R and B of the cruciform supporting structure 9 are of channel section. Mounted on the flanges of these channels and partially closing the opening therebetween are plates 88, 88a, 89, 89a, 90, 90a, 91 and 91a (Figs. 1 and 2, the purpose of which is to provide ways for supporting four carriages, such as 92 (Figs. 2, 3, 9, 14, 15, 16, 17 and 27). Projecting from the back of each of these carriages are two bifurcated bosses such as 93 (Figs. 3, 15 and 16). Supported between the walls which define the recess of each such boss are two shafts, 94 and 94a (Figs. 3 and 15), pivotally supported on which shafts are two oppositely-disposed dogs, 95 and 95a. The upper arms of these dogs are normally held in abutment against the base of the boss 93 by means of a compression coil spring 96, the ends of such spring being coupled together whereby the spring embraces the said upper arms. As appears from Figs. 3, 15 and 16, the lower arm of each dog carries two rolls, 97 and 97a, rotatably supported on shafts which are not shown.

Referring to Fig. 3, the sprocket-chain 75 is provided with a certain number of links, indicated by the reference characters 98 and 98a, having a pair of outwardly-projecting prongs which are adapted to enter, during the travel of the sprocket-chain over its sprocket-wheels, between the lower arms of the oppositely-disposed dogs 95 and 95a; and to thereby communicate the movement of the sprocket-chain to the carriage 92. The mode of effecting engagement between the moving chain and the carriage will be clear by assuming that the chain 75, as viewed in Fig. 3, is traveling to the left, and that the carriage 92 is at rest. In the course of the movement of said chain, the pair of prongs of one of these links, such as 98, will contact with the rolls, such as 99, which are mounted on the lower arm of the dog 95a, forcing said lower arm inwardly and upwardly to a position where the prongs will clear the rolls. Thereupon, the spring 96 restores the dog to the position shown in Fig. 3. The prongs thereafter press against the rolls 97 and 97a (Figs. 3, 15 and 16) of the oppositely-disposed dog 95, the upper arm of which latter dog is in abutment with the base of its supporting boss. The carriage is thus traversed along its way by the moving sprocket-chain. When, in the course of the movement of the sprocket-chain over the driving sprocket-wheel 74, the pronged links 98 begin to travel in a downward direction, they will pass out of their driving contact with the rolls of the dog 95 and from their previous position between said dog and dog 95a. Meanwhile, another pair of prongs will have similarly engaged another pair of dogs mounted on the carriage 92. It is contemplated that in the operation of the apparatus at least one pair of dogs shall always be in engagement with a pair of pronged links of the sprocket-chain, so that the table will move, in one direction or the other, immediately motion is imparted to the sprocket-chain.

As will appear from Figs. 3, 9, 15, 16 and 17, the carriage 92 is provided with a series of rolls, designated collectively by the reference numeral 100, for contacting with the inner surfaces of the supporting ways, such as 88 and 88a (Fig. 1); also with a series of rolls, designated collectively by the reference numeral 101, for contacting with the outer surfaces of such supporting ways; and with two series of rolls, designated collectively by the reference numeral 102, for contacting with the edges of said supporting ways. Referring to Fig. 17, each of the edge contact rolls 102 is rotatably supported on a shaft (not shown) mounted between the arms of a yoke 103, which yoke is provided with a shank portion 104, having formed therein a spline 105, adapted to be engaged by a dog-point screw 106, threaded into a boss 107 which projects from the carriage 92. The shank portion 104 of the yoke is operatively seated in a horizontal aperture formed in the boss 106. The inner wall of this aperture is threaded to receive a set-screw 108, provided with a lock-nut 109. By rotating the set-screw in the proper direction, the pressure thereof against the inner end of the shank forces the yoke and roll outwardly, thereby providing adjustment to insure adequate support for the carriage between the edges of the ways, while at the same time permitting freedom of movement of said carriage along such ways.

The rolls 101 of the series which bear on the outer surfaces of the ways are mounted on eccentric shafts 101' (Fig. 9), the ends of which shafts are provided with spanner-wrench holes, such as 110 (Figs. 3, 14 and 15), to permit of rotating the shafts for adjustment purposes. These shafts may be maintained in position by means of set-screws, such as 111, and lock-nuts, such as 112 (Figs. 3, 9, 14 and 15).

The central portion of the cruciform supporting structure 9, which forms a housing for the driving and driven bevel gears and the spur gears (Figs. 3 and 4), is provided with a cover member, designated generally by the reference numeral 113. The lower portion of this cover comprises a locating pilot, 114, which is adapted to enter co-operative recesses 115, 115a, 115b and 115c (Fig. 4), formed in the walls of the said gear housing. Integral with the locating pilot are four projecting bosses, such as 116 and 116a (Fig. 3), the purpose of which is to assist in supporting the ways, such as 88 and 88a (Fig. 1). The openings between these bosses permit of the passage of any of the carriages such as 92 across the central open space defined by the termination of the ways (Fig. 1), and into a position wherein the loud-speaker mounted on any such carriage can automatically be brought to the geometrical center of the cruciform supporting structure. The rolls with which each carriage is provided are of sufficient number and are so spaced as to furnish adequate support while the carriage is bridging the aforesaid central opening.

Referring now to Figs. 3, 9, 14, 15, 16, 17 and 27: each carriage such as 92 is provided with a centrally-disposed boss 117, extending slightly above the carriage floor and a considerable distance below the same. As appears from Fig. 9, there is rigidly mounted in this boss a shaft 118, carried on which shaft and between two collars 119 and 120 is the inner raceway of an annular ball bearing, designated generally by the reference numeral 121. The outer raceway of this bearing is supported in a cup 122, provided with an annular flange 123 for attachment to a gear housing 124, formed in a bracket member designated generally by the reference numeral 125. Attached to the shaft 118 is a worm-wheel 129, provided with a hub portion 129', between the upper end of which hub portion and a collar 130 (attached to the upper end of shaft 118) is the inner raceway of another annular ball bearing 131, the outer raceway of which bearing is seated in a recess formed in the roof of the housing 124, being held in position by means of a disk 132, attached to said roof. As will be apparent from Fig. 20, worm-wheel 129 is engaged by a worm 133, attached to a shaft 134, rotatably supported in bearings 135 and 135a in the wall of the housing 124. Also attached to shaft 134 is a spur gear 136, driven by a second spur gear 137, attached to the armature shaft 138 of a motor 139 (Fig. 9), said motor being mounted on the outer surface of one of the walls of the housing 124, and said armature shaft extending through said wall and into the housing. It will be obvious that upon the rotation of the motor armature shaft 138, the spur gears 137 and 136 and the worm 133, the reaction of the worm against the stationary worm-wheel 129 will cause rotation of the bracket member 125, together with the loud-speaker supported thereby.

Reference is now made to Figs. 9, 14 and 19, wherein is shown a second motor 140, mounted on the opposite wall of the housing 124. The armature shaft 141 of this latter motor carries a worm 142, driving a worm-wheel 143, attached to a shaft 144, rotatably supported in bearings 145 and 145a in the walls of the channel-shaped bracket arm 126. Also attached to this shaft 144 is a spur gear 146, driving a second spur gear 147, rotatably supported on a shaft 147', which is mounted in a boss 148 formed on one of the walls of said bracket arm 126. Meshing with spur gear 147 is a third spur gear 149, rotatably supported on a shaft 149', which is mounted in a boss 150 formed on said bracket wall. Integral with or attached to spur gear 149 is a bevel gear 151, driving another bevel gear 152, attached to a shaft 153, rotatably supported in bearings 154 and 154a in said bracket arm 126. Attached to the upper end of this shaft 153 (Fig. 9) is a bevel gear 155, driving another bevel gear 156, attached to one of two trunnion shafts, such as 157, which shafts are rotatably supported (preferably in annular ball bearings) in bosses 158 and 158a formed at the upper ends of the bracket arms 126 and 127. The inner end of each trunnion shaft enters and is attached to the shank portion of a supporting member, such as 159 and 159a. Each of these supporting members is provided with a flanged portion, such as 160 and 160a, for attachment to the shell of a drum-shaped loud-speaker 128. Rotation of the motor 140 and of the gear train driven thereby will thus turn the loud-speaker in its trunnion bearings.

Current for energizing the windings of the magnets, such as 46 and 46a (Figs. 3 and 4), of the clutches which control the movements of the carriage mounted on each of the arms T, L, R and B of the cruciform supporting structure 9 (Figs. 1 and 2) is conveyed to said cruciform supporting structure by means of trolleys, indicated in the wiring diagram of Fig. 28, which are carried by the disk 6 (Fig. 2) of insulating material, said trolleys being in electrical contact with conductors (also indicated in the wiring diagram), which are mounted in the disk 7' of insulating material. From the conductors of the disk 7' this current is conveyed to conductors such as 161 (Fig. 27), carried by a block 162 of insulating material, mounted in the ways such as 88 and 88a (Fig. 1). Thence the current passes to trolleys, such as 163 (Figs. 27, 31 and 32) which are supported in a spring conductor, such as 164, mounted in a block 165 (Fig. 27) of insulating material, supported on the carriage, 92. Each of these spring-mounted trolleys is electrically connected to one terminal of the winding of one unit of the duplex magnetic clutch, the other terminal of each such winding being grounded to the machine.

The motor 139 (Figs. 9, 14 and 19) which rotates the loud-speaker bracket 125 about the supporting shaft 118, and the motor 140, which rotates the loud-speaker 128 in its trunnion bearings, are preferably of the step-by-step type. Interrupted current for energizing the field windings of said motors is conveyed thereto as follows: in Figs. 23 and 26 is illustrated a motor 166, of the synchronous or other constant-speed type, which drives the control-strip feeding mechanism (hereinafter to be more fully described), and also continuously drives, through spur gears 167, 168 and 169, two oppositely-rotating units of an electrical distributor, said units being designated generally by the reference numerals 170 and 170a. The construction and mode of operation of these distributor units will now be described. Referring to Fig. 33, there is supported on a base 171 a bracket 172, provided with two apertures, rigidly mounted in which apertures are two annular blocks 173 and 173a of insulating material, each carrying a series of spaced conductors, such as 174. Adapted to be successively brought into electrical contact with these conductors of each distributor unit are six brushes, such as 175, maintained in electrical connection with said conductors by means of extension coil springs, such as 176, which springs are also in electrical contact with a flanged ring, such as 177, mounted on an annular brush-block, such as 178, of insulating material, which block may be attached by a pin, such as 179, to the shank portion of an armature, such as 180 and 180a, said armatures being adapted to be attracted by windings 181 and 181a, contained in frames 182 and 182a, attached to shafts 183 and 183a, and provided with spur gears such as 184 and 184a, whereby the annular brush-blocks and magnets of the two units are caused to rotate in opposite directions. Current may be conveyed to the magnet windings by means of brushes (not shown) contacting with insulated slip-rings (also not shown). Current is delivered to the flanged rings 177 and 177a, by means of a brush 185 and a brush 185a, which are held in contact with said rings, respectively, by extension coil springs 186 and 186a. One end of the shaft 183 is supported in a bearing 187 of the bracket 172 (Fig. 33), and the opposite end in a bracket 188 (Figs. 23 and 26). One end of shaft 183a is supported in a bearing 187a of the bracket 172, and the opposite end in a bracket 188a. When the magnet windings 181 and 181a are not energized, coil springs 189 and 189a maintain the armatures out of driving contact with the rotating frames and shafts, so that the annular brush-blocks 173 and 173a do not revolve. Upon the energization of said windings and the attraction of the armatures, the annular brush-blocks revolve, causing the brushes which are carried thereby to successively pass over the conductors such as 174 which are mounted in the stationary blocks 173 and 173a, thereby closing various electric circuits in a manner hereinafter to be described in detail. It is contemplated that during the operation of the apparatus, the distributors shall be continuously rotated and the windings thereof be continuously energized.

The interrupted current from each distributor unit is conveyed (in a manner hereinbefore described in referring to the energizing of the windings of the clutches 46 and 46a) to conductors, indicated in the wiring diagram, in a block 190 (Fig. 9) of insulating material, mounted on the bottom of the housing 124. These latter conductors are electrically connected with the stationary contacts, such as 194, 194a and 194b (Figs. 10 and 11) of three-pole magnetic switches, designated generally by the reference numerals 195 and 195a. Mounted on the armatures 196 and 196a of these switches are blocks 197 and 197a of insulating material carrying three movable contacts, indicated by the reference characters 198, 198a and 198b (Fig. 11). The field coils of the step-by-step motors 139 and 140 are connected at one terminal to these movable contacts, the other terminals thereof being grounded to the machine. The circuits connecting these field coils with either distributor unit 170 or 170a are closed upon the energization of the winding, such as 199 (Fig. 10), of one or other of these magnets—thus causing the step-by-step motor to rotate in one or other direction in synchronism with the movements of one or other of the distributor units. The means provided for selecting the magnet winding to be energized, and, therefore, for controlling the starting time, direction and period of rotation of the step-by-step motor, will be later described. As appears from Figs. 18 and 19, two pairs of these magnetic switches are mounted on opposite sides of the housing 124. One pair, such as 195 and 195a, controls the motor 139, while the other pair, designated generally by the reference characters 195' and 195", controls the motor 140.

Referring now to Figs. 9, 12 and 13: electrical impulses from one terminal of a sound amplifier may be conveyed to the windings of an electromagnetic device (not shown) which actuates the diaphragm of the loud-speaker, through connections (hereinafter described) to a brush 200 (Figs. 12 and 13), carried by a block 201 of insulating material, attached to the bearing 158a of the bracket 127 (Fig. 9). From the brush 200 the current impulses are conveyed to a conductor 202, on a block 203 of insulating material, attached to and rotatable with the shaft 157 (Fig. 9). Electrically connected to conductor 202 is one terminal of the winding of the electro-magnetic diaphragm-actuating device, the outer terminal of which winding is connected to a second conductor 204, also on the block 203. In electrical contact with this second conductor is a second brush 205 (Fig. 12), from which a return path is provided.

There will now be explained the means for and methods of automatically controlling, in co-ordination with the feeding of a picture film and the operation of sound-reproducing apparatus synchronized with the feeding of said picture film, the various electric circuits which include the hereinbefore described electrical translating devices, governing the loud-speaker moving, orienting and tilting mechanisms. In Fig. 21 is shown a plan view of a piece of photographic positive film, indicated generally by the reference numeral 206. The film is provided with the usual marginal sprocket-teeth apertures such as 207, and with a plurality of light-tracks, designated respectively as 208, 208a, 208b, 208c, 208d, 208e, 208f and 208g, which constitute the film a control-strip operative to open and close the several electric circuits of the system. The means for and methods of forming a negative of this control-strip will be described hereinafter in detail.

Referring now to Figs. 22, 23, 24, 25 and 26: mounted on the top of a housing, designated generally by the reference numeral 209, is a film magazine containing two reels, from one of which reels the control-strip is adapted to be fed through the housing and to the other reel. The film-feeding means comprise a motor 166 (Figs. 23 and 26), of the synchronous or other constant-speed type, driving a magnetic friction clutch 210, of the character illustrated in Figs. 5, 6 and 7. The driven shaft 211 of this clutch is supported in the bracket 188 (Figs. 23 and 26) and has attached to its outer end a worm 212, driving a worm-wheel 213, mounted on a shaft 213', which shaft is rotatably supported in a bracket 214 (Fig. 23). Attached to the lower end of the worm-wheel shaft is a spur gear 215, driving a second spur gear 216, attached to a shaft 217, rotatably supported near one end in a boss 218 formed on the rear wall of the housing 209. As appears from Fig. 23, the shaft 217 enters the housing and is rotatably supported near its outer end by the arms of a bifurcated boss 219, extending downwardly from the roof of the housing. Attached to the shaft and located between the aforesaid arms is a duplex driving sprocket-wheel 220, the teeth of which engage the marginal apertures such as 207 of the control-strip 206. Also mounted on a shaft 221 (Fig. 22), and located between said arms (Fig. 23), is an idler roll 222, co-operating with the sprocket-wheel 220 to maintain the control-strip in position. Also extending downwardly from the roof of the housing is a second bifurcated boss 223 (Figs. 22 and 23). Rotatably supported on a shaft 224 (Fig. 22) extending between the arms of this last-named boss is an idler sprocket-wheel 225 for guiding the control-strip in its passage through an aperture 225' (Fig. 22) from the delivery reel of the magazine. Integral with or supported on the floor of the housing 209 is a bracket 226 (Figs. 22, 23 and 24), between two legs of which bracket and rotatably supported on a shaft 227 (Fig. 22) is a second idler sprocket-wheel 228. Between the other two legs of the bracket and rotatably supported on a shaft 229 (Fig. 22) is a third idler sprocket-wheel 230. Rotation in the proper direction of the driving sprocket-wheel 220 draws the control-strip from the left-hand reel (as viewed in Fig. 22), through the aperture 225', and over idler sprocket-wheels 225, 228 and 230.

Also attached to shaft 217 (Figs. 23 and 26) is a pulley 231, over which runs a spring belt 231a to a coacting pulley attached to the shaft of the receiving reel, whereby the shaft 217 drives said receiving reel—the slippage of the spring belt on the pulleys compensating for variations in the amount of film on said receiving reel.

Supported from the floor of the housing by brackets such as 232 and 232a (Fig. 22) is a platform 233. Mounted on the upper surface of this platform is a manifold, designated generally by the reference numeral 234. As appears from Fig. 23, this manifold, in plan view, conforms to a portion of a segment of a circle. The manifold is divided into a series of radial compartments, each compartment being provided with a photoelectric cell, one of which cells is illustrated in Figs. 22, 23 and 25 and indicated by the reference numeral 236. These photoelectric cells are installed on a peripheral wall element 235, which is common to all the compartments. The manifold is provided with a light-tight cover 237, which is removable therefrom. The peripheral wall element 235 is provided with dovetail slots which embrace the outer end portions of the radial walls defining the several compartments, as is indicated in Fig. 23. With the cover 237 removed, the peripheral wall element, together with the photoelectric cells installed thereon, may be raised, for example in order to replace defective cells. In Fig. 25 is shown a sectional view of the peripheral wall element, illustrating the same as formed of moulded insulating material imbedded in which is a socket 238 for receiving one of the cells such as 236. The socket of each compartment is electrically connected, as by means of a screw 239, to a common bus-bar 240, which is grounded to the control-box. The other terminal of the cell is electrically connected to the base thereof, and in electrical contact with said base is a spring conductor 241, attached to the peripheral wall element and in electrical contact with a binding-post 242.

As appears from Fig. 23, the manifold 234 terminates in an inner wall the outer surface of which is concave. A light-slit such as 243 (Fig. 22) communicating with each compartment is provided in this inner wall, through which slit may be projected light rays which impinge upon the photoelectric cell and thereby activate the same. Formed in the upper portion of the bracket 226 is a cylindrical chamber adapted to receive a lamp 244. (Fig. 22), supported in a socket 245, provided with a flange 246 which is adapted to be attached to a co-operative flange 247 formed at the rear of the chamber. The opposite end of the chamber is closed by means of semi-cylindrical cover 248 (Figs. 22 and 23), provided with light-slits such as 249 (Fig. 24) in registration with the light-slits such as 243 extending through the aforesaid inner wall of the manifold 234. The control-strip 206 is fed between the convex outer surface of the lamp chamber cover 248 and the outer concave surface of the inner wall of the manifold 234. In the process of such feeding, light from the lamp 244 is projected through all the light-slits such as 249 in the cover 248, thence through any light-track in the control-strip which may be passing over said cover, through the light-slit of the inner wall of the manifold 234 which is in registration with said light-track, and then impinges upon the photoelectric cell installed in that compartment and activates said cell. It is to be understood that the outer convex surface of the cover 248 is separated from the concave outer surface of the inner wall of the manifold by only slightly more than the distance represented by the thickness of the control-strip—thus confining the projected light rays to the desired path. Either the convex outer surface of the cover 248 or the concave outer surface of the inner wall of the manifold, or both, may be faced with felt or other suitable material apertured with light-slits registering with those in the cover and in the inner wall, thereby still further assuring the proper directing of the projected light rays.

In order that the control-strip may readily feed through the arcuate space between the cover and the manifold, a bell-mouth guide 250 (Fig. 22) is provided for temporarily transversely flexing the strip to the desired curve. This deformation of the strip is facilitated and the maintenance thereof in alignment so that its light-tracks will register with the light-slits of the cover and with those of the compartments of the manifold is effected, by two idler sprocket-wheels, 251 and 251a (Fig. 23), rotatably supported on shafts (not shown) which are mounted in bosses 252 and 252a, formed on the outer wall surface of the lamp chamber portion of the bracket 226.

Fig. 27a illustrates diagrammatically a motion-picture screen a, a motion-picture projector b, a structure c supporting a plurality of movable sound-projectors, and a portion of a control record d for governing the movements of said sound-projectors, in accordance with the present invention.

Fig. 28 shows schematically various electrical translating devices employed for governing the loud-speaker moving, orienting and tilting mechanisms, together with a diagram of a wiring system therefor. The cover 237 of the photoelectric cell manifold 234 is here shown as broken away to illustrate seven of the compartments, each containing a photoelectric cell—these cells being designated respectively by the reference characters 236a, 236b, 236c, 236d, 236e, 236f and 236g. The lamp 244 which activates said cells is shown fragmentarily.

Direct current is supplied from two mains, 253 and 253a, connected to a source, not shown. The machine illustrated in Figs. 1 and 2 is electrically connected to main 253a and thus forms a common ground for many of the electric circuits of the system. At the extreme left-hand side of the diagram is indicated a rheostat 254, the arm 255 of which is connected by a line 256 to the main 253. Connected to one end of the resistance elements of the rheostat is a line 257, leading to one terminal of the winding of the magnetic clutch 210 (Fig. 26). Connected to the other terminal of said clutch winding is a line 258, which is grounded. At the extreme right-hand side of the diagram is shown a similar rheostat 259, the arm 260 of which is connected by a line 261 to the main 253. Connected to one end of the resistance element of the latter rheostat is a line 262, leading to one terminal of the winding of a magnetic clutch 210a. Connected to the other terminal of said clutch winding is a line 263, which is grounded. This second clutch 210a is employed as a driving connection between a synchronous or other constant-speed motor (not shown) and the picture-and-sound-track film feeding mechanism (also not shown). The purpose of the rheostats is to enable the operator to effect a slight slippage of either clutch at any time it may be necessary to correct for inaccuracies in the coordinated feeding of the picture-and-sound-track film and the control-strip.

Whenever photoelectric cell 236a is activated by projected light rays from the lamp 244 passing through one of the light-slits 249 (Fig. 24), through one the the light-slits such as 208 (Fig. 21) of the control-strip 206, and through a light-slit such as 243 (Fig. 22) in the inner wall of the manifold 234, current flows from main 253 through a line 264, through the coil 265 of a relay (designated generally by the reference numeral 266), through a line 267 to one terminal of the photo-electric cell 236a, and through said cell to ground. The relay coil 265 is thereby energized, attracting its armature 268, raising said armature and causing its flanged end portion to bridge the contacts 269 and 270, whereupon one portion of current flows through the following circuit: from main 253 through line 264, through line 271 electrically connected to contact 270, through the flanged end portion of the relay armature 268, through contact 269, through line 272 electrically connected to said contact, to one terminal of the winding of a magnetic switch 273, through said winding and thence through a line 274 to ground. The consequent energization of the magnet winding of the switch 273 causes it to attract its armature 275, which carries a contact member 276, connected by line 277 and by a line 264 to main 253. The downward movement of armature 275 brings contact member 276 into electrical connection with a contact member 278, mounted on the frame of the magnet, thereby closing an electric circuit through which another portion of current flows as follows: from main 253 through a line 264, a line 277, contact member 276, contact member 278, a line 279, conductor 280 carried by disk 6 of insulating material (Fig. 2), through a spring-mounted trolley 163 (such as is illustrated in Figs. 31 and 32), through a conductor 281 carried by the disk 7' of insulating material (Fig. 2), through a line 282 electrically connected to a conductor 161 (illustrated in Fig. 27 as being mounted on one of the ways, such as 88a of the arm T of the cruciform supporting structure 9 of Figs. 1 and 2), through a brush 283 mounted on the carriage 92 (Figs. 9, 14, 15, 16, 17 and 27), through a line 284 to a conductor 285 in electrical contact with a brush such as 191 (Fig. 9), through a conductor such as 192 (Fig. 9), through a line 286 to one terminal of the winding such as 199 of a magnetic switch such as 195 (Fig. 10), and through said winding to ground. The consequent energization of the magnet winding causes it to attract its armature 196 and to close three circuits by bringing movable contact 198 (Fig. 11) into electrical connection with stationary contact 194, movable contact 198a into electrical connection with stationary contact 194a, and movable contact 198b into electrical connection with stationary contact 194b.

When the apparatus is about to be operated, the switch 287 is closed and a portion of current flows through the following circuit: from main 253 through a line 288, switch 287, a line 289, a branch line 290, to one terminal of a winding such as 181 (Fig. 33) of the magnetic clutch 170 (which is continuously rotated by the constant-speed motor 166 (Fig. 26), in a manner hereinbefore described), and through the said winding to ground. Another portion of current flows through a branch line 291 to one terminal of a winding such as 181a (Fig. 33) of the magnetic clutch 170a, which is also continuously rotated by the said constant-speed motor 166. The energization of these magnet windings causes them to attract their respective armatures 180 and 180a and continuously to rotate their brush-blocks 178 and 178a. Another portion of current is conveyed from branch line 290 through a line 292 to the brush 185 (Fig. 33), thence to the flanged ring 177, through the brush springs such as 176 to the six brushes 175, 175a, 175b, 175c, 175d and 175e (Fig. 28), and by said brushes successively to the spaced conductors 174, 174a, 174b, 174c, 174d and 174e of the distributor unit 170.

When, in the course of the rotation of the brush-block 178, the brushes reach contacts 174a and 174d, one portion of current flows through the lines 311 and 312 to the common line 313, thence through a conductor 280a carried by the disk 6 of insulating material (Fig. 2), through a spring-mounted trolley 163a (such as is illustrated in Figs. 31 and 32), through a conductor 281a carried by the disk 7' of insulating material (Fig. 2), through a line 296 electrically connected to a conductor 161a (similar to 161 illustrate in Fig. 27 as being mounted on one of the ways such as 88a of the arm T of the cruciform structure 9 of Figs. 1 and 2), through a brush 283a mounted on the carriage 92 (Figs. 9, 14, 15, 16, 17 and 27), through a line 298 to a conductor 285a in electrical contact with a brush 191a (such as is designated by the reference numeral 191 in Fig. 9), through a conductor 192a (such as is designated by the reference numeral 192 in Fig. 9), through a line 299 to stationary contact 194a of the magnetic switch 195, through movable contact 198a of said magnetic switch, through a line 300 to one terminal of a field coil 301 of a step-by-step motor such as 139 (Figs. 9, 14 and 19), through said field coil 301 to one terminal of a field coil 302 in series with said first-named field coil, through a line 303 to a common line 304, and thence to ground.

With the brushes in the positions shown in Fig. 28, one portion of current flows from conductors 174b and 174e through lines 305 and 306 to the common line 307, thence through various conductors identical with those described in the last paragraph to one terminal of a field coil 308 of the aforesaid step-by-step motor, through said field coil to one terminal of a field coil 309 in series with said field coil 308, through a line 310 to common line 304, and thence to ground.

Another portion of current flows from conductors 174 and 174c through lines 293 and 294 to the common line 295, thence through various conductors identical with those described in the second last paragraph to one terminal of a field coil 314 of the aforesaid step-by-step motor, through said field coil to one terminal of a field coil 315 in series with said field coil 314, through a line 316 to common line 304, and thence to ground.

The armature of the step-by-step motor is thus caused to rotate in synchronism with the distributor brush-block. It is to be borne in mind that the brush-blocks 178 and 178a are rotating in opposite directions. It will be noted that the movable contact members 194, 194a and 194b of the magnetic switch 195 are connected, respectively, by lines 317, 318 and 319, to the corresponding contacts of the magnetic switch 195a, which latter switch receives current impulses from the oppositely-rotating distributor unit 170. The winding of the magnet of the switch 195a is controlled by photoelectric cell 236b in the same manner as photoelectric cell 236a has been described as controlling the winding of the magnet of switch 195. Thus, the step-by-step motor will rotate in one direction or the other, depending upon whether cell 236a or cell 236b is activated, the current from one or other of the oppositely-rotating distributor units being delivered to the movable contacts of whichever of the switches 195 and 195a has its magnet winding energized to bring such movable conductors into electrical connection with its stationary conductors, which latter are in permanent electrical connection with the distributor units, respectively.

The foregoing description applies to the automatic control and operation of each of the step-by-step motors, such as 139 and 140 (Figs. 9, 14 and 19), installed on the housing of the loud-speaker which is mounted on each of the arms T, L, R and B of the rotatable cruciform supporting structure 9 (Figs. 1 and 2). Thus, in the course of the feeding of the control-strip, any of these four loud-speakers may be automatically rotated, either about its supporting shaft or in its trunnion bearings, or both. The automatic selection of the proper motor, the time when the operation thereof begins, and the direction of rotation thereof are determined by the presence, on the control-strip, of a corresponding light-track. The period of such operation, and, consequently, the extent of rotation of any of the four loud-speakers, either about its supporting shaft or in its trunnion bearings, is determined by the length of time during which the controlling photoelectric cell is activated, which period of activation is, in turn, dependent upon the length of the particular light-track. As illustrated in Fig. 21, the light-tracks of the control-strip may be side by side. Hence it is possible, should operating conditions necessitate, to simultaneously rotate all four of the loud-speakers, each about its two axes. Sixteen of the photoelectric cells installed in the manifold 234 are employed for controlling the eight loud-speaker motors.

In further reference to Fig. 28: photoelectric cell 236c is illustrative of four cells employed to operate switches which direct, to any of the four loud-speakers, current impulses produced in any well-known manner, as by a photographic sound-track and apparatus controlled thereby, in order that the particular loud-speaker may reproduce and project the sound waves recorded on said sound-track. A source of electrical energy, indicated by the reference numeral 320, supplies current to an amplifier 321, which may be of any well-known type. When photoelectric cell 236c is activated, in a manner hereinbefore described, current flows from main 253 through line 322, through the coil 323 of a relay 324, through a line 325 to one terminal of said cell 236c, and through said cell to ground. The consequent energization of the relay coil causes it to attract and raise its armature 326, thereby bridging the contacts 327 and 328, whereupon current flows from main 253 through line 322, line 329, contact 327, the bridging portion of armature 326, contact 328, line 330 to one terminal of the winding of a magnet 331, through said winding and through a line 332 to ground. The consequent energization of the magnet winding causes it to attract its armature 333, bringing a contact member 334 which is mounted on said armature into electrical connection with a stationary contact member 335, which is mounted on the magnet frame. Thereupon, current from the source 320 flows through the electrical translating devices of the amplifier 321, from one terminal of the amplifier through a line 336 to the armature contact member 334, through stationary contact member 335, through a line 337, a conductor 280b, through a spring-mounted trolley 163b, through a conductor 281b, through a line 338, through a conductor 161b, through a brush 283b, through a line 339, through a conductor 285b, through a brush 191b, through a line 340, through a conductor 192b, through a line 341, through a brush such as 200 (Fig. 13), through a conductor such as 202 (Fig. 13), through the electro-magnetic sound-reproducing device installed in the loud-speaker and here designated by the reference numeral 342 (Fig. 28), through a line (not shown) leading to the conductor 204 (Fig. 13), through the brush 205 of Fig. 13, and through a line 343 leading from said brush to the opposite terminal of the amplifier 321. It is to be understood that the devices indicated at 280b, 163b, 281b, 161b, 283b, 285b, 191b and 192b correspond respectively with the devices 280, 163, 281, 161, 283, 285, 191 and 192 which have been hereinbefore described as included in the circuits which are controlled by photoelectric cell 236a.

Photoelectric cells 236d and 236e are illustrative of eight cells installed in the manifold 234 for controlling electrical translating devices which govern the operation of four duplex magnetic clutches, one of which is installed in each of the arms T, L, R and B of the cruciform supporting structure 9 (Figs. 1 and 2). One of these duplex clutches is shown in Fig. 4, the magnet frames thereof being designated respectively by the reference characters 46 and 46a. The mode of operation of the relays, such as 266b and 266c, controlled by the photoelectric cells, and of the magnetic switches, such as 273c, governed by the relays, is identical with that of the corresponding devices hereinbefore described as being controlled by photoelectric cells 236a, and 236b and 236c. With one or other of the magnetic switch windings energized, current flows, in a manner hereinbefore described, through a conductor 280c (corresponding to conductor 280), through a spring-mounted trolley 163c (corresponding to trolley 163), through a conductor 281c (corresponding to conductor 281), through a line 344 to one terminal of one of the magnetic clutch windings, through said winding and through a line 345 to ground—thereby energizing said winding and causing it to attract its armature and effect a driving connection, in a manner hereinbefore described, and to thereby move one of the carriages, such as 92, in one or other direction along its supporting ways.

Photoelectric cells 236f and 236g similarly control the two windings of the duplex magnetic clutch 24 of Fig. 2, thus producing rotation, in one or other direction, of the cruciform supporting structure 9.

In Figs. 29, 30, 34, 35, 36, 37 and 38 is illustrated apparatus for conveniently and accurately making a negative of the control-strip 206 of Fig. 21, which apparatus will now be described in detail.

Referring to Figs. 29, 30, 34, 35 and 36; a housing 346 is provided for the various mechanisms and the electrical translating devices by which their movements are governed. The apparatus is manually actuated by means of a handle 347 (Figs. 29, 30 and 34), attached to a hand-wheel 348, mounted on a shaft 349, which also supports a wheel 350. Formed in the periphery of hand-wheel 348 are 120 depressions, such as 351, adapted to be engaged by a spring detent 352 (Figs. 29 and 34). As appears from Fig. 30, the wheel 350 is provided with a central web 353 and a hub 354 for attachment to the shaft 349. The wheel is also provided with an outer flange 355 and an inner flange 356. Each of these flanges is perforated to form 120 apertures. The apertures of the outer flange 355 are adapted to be engaged by a spring detent 357 (Figs. 29, 30 and 34), seated in the rim of the hand-wheel 348 to drive the same, or disconnected therefrom to leave the same stationary. The apertures of the inner flange 356 of the wheel are adapted to be engaged by another spring detent 358 (Fig. 30), mounted on the outer wall surface of the front of the housing 346—the latter detent being constructed and arranged to be continuously operative to engage one or other of the apertures of said inner flange.

As is shown in Fig. 30, the shaft 349 enters the housing through a boss 359, formed in the front wall thereof. Attached to that portion of the shaft inside the housing which is immediately adjacent the inner surface of the front wall thereof is a driving spur gear 360 (illustrated most clearly in Fig. 35), which meshes with a pinion 361, attached to an idler shaft 362, rotatably supported in bearings one of which is formed in a boss (not shown) on the inner surface of the front wall of the housing, and the other of which is formed in a boss 364 (Fig. 34) on the front surface of a girder member 365 extending between the side walls of the housing. Also attached to idler shaft 362 is a spur gear 366, which in turn drives a pinion 367, attached to a shaft 368, rotatably supported in bearings one of which is formed in a boss (not shown) on the inner surface of the front wall of the housing, and the other of which is formed in a boss 370 extending on either side of the girder member 365. The shaft 368 extends through the boss 370 and has attached to its outer end the hub of a magnet frame such as 182 (Fig. 33). A flange of the magnet frame comprises a spur gear, such as 184, which gear oppositely drives a coacting gear, such as 184a (Fig. 33), formed in a corresponding flange on a second magnet frame 182a. The two magnet frames are provided with windings, armatures, brush-blocks, stationary conductor members and other parts necessary to constitute the device a duplex distributor for electrically driving step-by-step motors, after the manner hereinbefore described in explaining the mode of operation of the corresponding devices of the full-size apparatus. The base of this duplex distributor is mounted on a girder member 371 (Fig. 30), extending between the side walls of the housing.

Also attached to shaft 349 is a second and larger driving gear 372, which drives a pinion 373, attached to an idler shaft 374, rotatably supported in bearings one of which is formed in a boss 375 on the inner surface of the front wall of the housing, and the other of which is formed in a boss 376 on the front surface of the girder member 365. Also attached to idler shaft 374 is a spur gear 377, which drives a pinion 378, attached to a shaft 379, rotatably supported in bearings one of which is formed in a boss 380 on the inner surface of the front wall of the housing, and the other of which is formed in a boss 381 extending on either side of the girder member 365. The shaft 379 extends through the boss 381, and has attached to its outer end the hub of the magnet frame of one unit of a duplex distributor, identical in all respects with that illustrated in Fig. 33 and with that actuated by shaft 368, in the manner hereinbefore described. The base of this latter duplex distributor is mounted on the bottom surface of a girder member 382 (Figs. 30 and 35) which extends between the side walls of the housing.

Driving gear 372 also drives a pinion 383, attached to an idler shaft 384, rotatably supported in bearings one of which is formed in a boss 385 on the inner surface of the front wall of the housing, and the other of which is formed in a boss 386 on the front surface of the girder member 365. Also attached to idler shaft 384 is a spur gear 387, which drives a pinion 388, attached to an idler shaft 389, rotatably supported in bearings one of which is formed in a boss 390 on the inner surface of the front wall of the housing, and the other of which is formed in a boss 391 on the front surface of the girder 365. Also attached to idler shaft 389 is a spur gear 392, which drives a pinion 393, attached to a shaft 394, rotatably supported in bearings one of which is formed in a boss 395 on the inner surface of the front wall of the housing, and the other of which is formed in a boss 396 extending on either side of the girder member 365. The shaft 394 extends through the boss 396 and has attached to its outer end the hub of a magnet frame of one unit of another duplex distributor, identical in all respects with that illustrated in Fig. 33 and with those actuated by shafts 368 and 379, in the manner hereinbefore described. The base of this latter duplex distributor is mounted on the girder 371.

Main driving shaft 349 is rotatably supported in a bearing formed in a boss 396' extending on either side of the girder element 365. The shaft extends through this boss and has attached to its extreme end a spur gear, such as 38, meshing with two spur gears such as 39 and 40 (Fig. 8) to drive a duplex magnetic clutch similar in construction to that shown in Fig. 8, except that the shaft 62, which is actuated by whichever side of the duplex clutch has its magnet winding energized, carries a bevel gear 397 in place of the worm 64 shown in Fig. 8. This bevel gear 397 drives another bevel gear 398 mounted on a vertical shaft 399, rotatably supported in bearings formed in bosses 400 and 401 on the front surface of a partition wall 402, which divides the housing 346 into two compartments. Attached to the upper end of the vertical shaft 399 is a bevel gear 403 (Fig. 30), which drives another bevel gear 404, attached to a horizontal shaft 405, rotatably supported in an annular ball bearing 406, mounted in a boss 407 on the said partition wall 402, and in an annular ball bearing 408, mounted in a hub 409 of a spider element 410, provided with a rim portion 411, adapted to be attached to the roof and the side walls of the housing and also to a girder member 412 extending between said side walls. Mounted in the spider element 410 is a disk 413 of insulating material, carrying a number of annular electrical conductors, such as 414.

At its left-hand end (as viewed in Fig. 30), there is attached to the horizontal shaft 405 the hub of a cruciform supporting structure, denoted generally by the reference numeral 415 and representing in miniature the full-size cruciform supporting structure 9 illustrated in Figs. 1 and 2. The four arms of this miniature structure are designated by reference letters $t$, $l$, $r$ and $b$—indicating, respectively, "top", "left", "right" and "bottom," as the arms appear in the drawings. Attached to the back of each of the arms is a sheet 416 of insulating material (Figs. 30 and 31), carrying spring-mounted trolleys such as 163 (Figs. 31 and 32), adapted to roll over the surfaces of the annular conductors, such as 414, which are mounted in the disk 413, supported by the spider element 410. Current is thus conveyed to the arms of the cruciform supporting structure for the purpose of actuating electrical translating devices which are carried thereby. When the hand-wheel 348 is rotated and one or other of the windings of the duplex magnetic clutch (indicated generally in Figs. 30 and 34 by the reference numeral 417) is energized, the vertical shaft 399 is driven in one direction or the other, thereby rotating the horizontal shaft 405 and the cruciform supporting structure 415. It is thus possible to produce manually in the miniature apparatus the same rotary movements of the cruciform supporting structure as are required to be automatically reproduced in the operation of the full-size apparatus, and to accomplish this result in the small-size apparatus as slowly and accurately as may be practically necessary.

Each arm of the miniature cruciform supporting structure 415 is provided with ways, indicated (Fig. 35) by the reference characters 418, 418a, 419, 419a, 420, 420a, 421 and 421a, similar to those installed on the full-size structure 9. Miniature carriages, such as 422 (Figs. 30 and 35), are adapted to travel along these ways and to receive current therefrom in much the same manner as do the carriages such as 92 of the full-size apparatus. Instead of being driven by sprocket-wheels and sprocket-chains, however, the miniature carriages are driven by means of lead-screws, such as 423 (Figs. 30 and 35), rotatably supported in annular ball bearings (not shown), one of said bearings being mounted in the end wall such as 424 (Fig. 30) of each arm, and the other in a partition wall, such as 425 (Figs. 30 and 35) near the junction of the four arms.

Referring now to Fig. 30: extending from the floor of the carriage 422 is a lug portion 426, provided with an internal screw-thread co-operative with the screw thread of the lead-screw 423, whereby rotation of the lead-screw in one direction or the other moves the carriage along its ways. Each lead-screw is driven, through spur gears such as 427 and 428 (Fig. 30), by a small step-by-step motor such as 429, installed near the outer end of its supporting arm. Mounted on the frame of each of these step-by-step motors is a single-pole electro-magnetic switch, such as 430, for connecting the motor in circuit with the distributor from which it receives interrupted current, in a manner hereinbefore described in explaining the operation of the step-by-step motors of the full-size apparatus.

Supported on each carriage, such as 422, is a miniature dummy of a loud-speaker, designated generally by the reference numeral 431, and provided with two step-by-step motors, such as 432 and 433, for actuating gear trains (not shown) which are generally similar to those employed in the full-size apparatus, whereby said miniature dummies may be caused to rotate in either direction about one or both of their axes, after the manner in which the full-size speakers have been described as operating. Each of these miniature step-by-step motors is provided with a single-pole electro-magnetic switch, such as 434 and 435, for connecting it in circuit with the distributor from which it receives current impulses, in a manner to be hereinafter described. It will be noted from Figs. 30 and 35 that the miniature dummies of the speakers are mounted at the extreme opposite ends of their carriages from the lug portion 426 through which the drive of said carriages is effected. The overhanging portion of each carriage thus permits its speaker to be moved to the geometrical center of the cruciform support.

Reference is now made to Figs. 30, 34 and 36. As hereinbefore stated, the partition 402 divides the housing 346 into two compartments. The rear compartment comprises a camera in which a photographic film is exposed and installed in which compartment are the several devices employed in making the negative of the control-strip. Rotatably supported on a shaft mounted between two brackets 436 and 437 (Figs. 34 and 36) is a film reel 438, attached to the hub of which reel is a pulley 439, carrying a spring belt 440, driven by a similar pulley 441, attached to a shaft 442, rotatably supported in bearings formed in brackets 443 and 444, projecting from the rear surface of the partition 402. Also attached to shaft 442 is a spur gear 445, driven by a spur gear 446, attached to a shaft 447 also having its bearings in the brackets 443 and 444. Also attached to shaft 447 is a worm-wheel 448 (Fig. 36), driven by a worm 449, attached to the armature shaft 450 of a step-by-step motor 451, mounted on the rear surface of the partition 402 and actuated in a manner to be hereinafter described. Spring belt 440 also runs over a third pulley 452, attached to the hub of a second film reel 453, rotatably supported on a shaft mounted in bearings formed in two brackets 454 and 455, extending from the side walls of the housing 346. Also attached to shaft 442 is a driving sprocket-wheel 456, the teeth of which engage the marginal apertures of a photographic film 457. A similar sprocket-wheel 458 is attached to a shaft 459, rotatably supported in bearings formed in the brackets 443 and 444, and carrying a spur gear 459', driven by a spur gear 446. Also attached to shaft 447 is a roll 460, adapted to co-operate with sprocket-wheels 456 and 458 in order to maintain the film in position thereon.

Rotatably supported in bearings formed in brackets 461 and 462 (which extend from the partition wall 402) is a shaft 463, attached to which is a roll 464 having a convex periphery (Fig. 36) over which the film 457 is fed—the purpose of this roll being to support the film and to temporarily flex it transversely during the feeding process, in order that it may conform to the concave wall surface of a lamp manifold 465, which is mounted on lugs such as 466 and 466a (Fig. 30) projecting from the partition wall 402. This lamp manifold is structurally similar to the photoelectric cell manifold 234 (Figs. 22 and 23) hereinbefore described. The lamp manifold is divided into a series of radial compartments, the number of which corresponds with the number of light-tracks required to be formed in the control-strip. In Fig. 36 the cover 467 of the lamp manifold is shown as partially broken away in order to illustrate the construction and arrangement of one of the compartments. The converging walls 468 and 469 of the compartment join a front wall 470, which is provided with a series of light-slits such as 471, there being one light-slit communicating with each compartment. Mounted on a peripheral wall element 472 (which is common to all the compartments and which is provided with dovetail slots adapted to engage the outer ends of the walls defining said compartments) are lamps such as 473, which, when energized, project light rays through the slits, such as 471, thereby light-fogging the film 457. The feeding of the film across the light-slits thus produces thereon light-fogged paths comprising negatives of light-tracks.

The shaft which supports the reel 438 may be provided with a knurled head 474 to facilitate its removal from its bearings for the purpose of changing the reels. A similar knurled head 475 may be formed on the shaft which supports the reel 453.

It is to be understood that the rear compartment must, because of its camera function, be operatively light-tight. A cover 476 (Fig. 34) is adapted to close the rear of the compartment, being attached by bolts to bosses such as 477 (Figs. 34 and 36), formed on the housing walls. This cover may be provided with a border of felt or other suitable material for insuring a light-tight contact with the housing.

Referring now to Figs. 30 and 37: the upper portion of the front compartment of the housing 346, wherein the cruciform supporting structure 415 is rotatably mounted, is provided with a window-pane 478. This window-pane is preferably made of glass, on which are etched 120 radial lines, which radial lines are intersected by 16 concentric circles—thus providing 1920 intersection points, each of which is defined by its particular radial line and concentric circle, said lines and circles being numbered in the manner shown in Fig. 37. The opposite face of the pane is ground or etched to afford sufficient background to permit of projecting pictures thereon, without, however, rendering it difficult to observe therethrough the cruciform support 415 and the carriages and dummy speakers mounted on said support. Observation of these devices through the more or less translucent pane is facilitated by flooding such devices with light from lamps such as 479 (Fig. 35), of which four are installed in the corners of the housing and immediately adjacent the circular path traveled by the cruciform structure. The arms of the cruciform structure, together with their ways, may be colored black, while the several carriages and their supported dummy speakers may be plated with chromium or nickel in order to provide a strong contrast for aiding in locating the positions of the carriages on the arms. A strongly contrasting background for the arms may be provided by mounting therebetween sheets of white material, such as paper or aluminum, designated by the reference numeral 480 (Figs. 31 and 35). The annular conductors, such as 414, which would otherwise form a confusing background for the cruciform supporting structure, are thereby concealed.

It is contemplated that a moving-picture projecting machine (not shown) shall project onto the window-pane 478 (Fig. 37), on the small scale of the apparatus, the picture-frames and sound-tracks which are to be observed by the operator in order to enable him to determine the corresponding location, on a full-size projection screen, of the pictures of the actors who are presumed to be speaking, their orientation with reference to the audience, and the inclination of their heads; and also to determine, either by observation of the sound-track or by the synchronous operation of the sound-reproducing apparatus, or by both, the points on the film at which speech begins and ends. The projecting machine is to be operatively so positioned that the picture frames will be projected within the square which is designated as 481, thus giving such projected frames the same relative positions which they will occupy when later projected upon a full-size screen. A small perforation in the geometrical center of the first frame will, by means of light rays projected therethrough, permit of centering the projected pictures both with reference to the window-pane and to the cruciform supporting structure 9 (Fig. 1). The radial and concentric lines formed on the window-pane are preferably filled with a dark pigment, in order to provide a contrast for the lighter pictures. Should the photographic character of the pictures be such that insufficient illumination is provided to enable the operator to clearly distinguish the position of the arms of the cruciform supporting structure and of the carriages and dummy speakers thereon, he may note the intersection of the particular radial and circular lines which register with the picture of the actor's face when he is speaking, extinguish the picture- and sound-track projecting lamp, light the four lamps such as 479, and then proceed to rotate the cruciform supporting structure into alignment with the radial line, feed the carriage radially inwardly or outwardly as may be necessary, and rotate the dummy speaker about its two axes in order to bring it into the positions of orientation and angular inclination corresponding with the observed projected picture, while simultaneously forming on the negative film 457 (Figs. 30, 34 and 36) the light-tracks which thereafter and automatically will reproduce such movements in the full-size apparatus.

The mode of operation of the apparatus whereby the foregoing movements are effected and the film is simultaneously light-fogged to constitute it a negative for a positive control-strip, will now be explained. Referring again to Figs. 30 and 34: the duplex distributor designated generally by the reference numeral 482 delivers current impulses (in a manner to be hereinafter described) to the four carriage-moving step-by-step motors, such as 429. The duplex distributor designated generally by the reference numeral 483 delivers current impulses (in a manner to be hereinafter described) to the eight step-by-step motors, such as 432 and 433, which rotate the dummy speakers about their supporting shafts and in their trunnion bearings. The duplex distributor designated generally by the reference numeral 484 delivers current impulses to the step-by-step motor 451 (Figs. 30, 34 and 36) which feeds the film negative 457, from which the positive control-strip is to be made. This latter distributor also delivers current impulses to a step-by-step motor (not shown) which feeds the composite picture-and-sound-track film through the projecting machine (also not shown).

For illustrative purposes only, the following values will be assumed for the various functions of the full-size apparatus: a control-strip feed of one inch per second, or say one-eighteenth the feeding rate of the composite picture-and-sound-track film; rotation of the cruciform supporting structure 9 (Figs. 1 and 2) at the rate of one revolution in fifteen seconds (giving, with a 12-foot structure, a peripheral speed of about 150 feet per minute); a rate of travel of the carriage which will move it from the center of the cruciform supporting structure to the end of the arm, or vice versa, in two seconds; a rotation of the loud-speaker about its supporting shaft at a rate of 360 degrees in two seconds; and a rotation of the loud-speaker in its trunnion bearings at the same rate of 360 degrees in two seconds. It is contemplated that, except under the condition of relatively rapid dialogue, the cruciform supporting structure will have been rotated to bring into proper angular position the arm nearest the desired location, the carriage will have been traversed along said arm, the two rotative movements of the loud-speaker will have been effected, and the loud-speaker will have been connected to the amplifier, all well in advance (for example, two seconds) of the beginning of the speech. It will be noted that the cruciform supporting structure will never require to be rotated more than 45 degrees to bring one of its arms into any desired angular position—the maximum time necessary for its operation thus being somewhat less than two seconds. Referring to Fig. 2, a slight slippage of the belt 11, upon the occasion of starting or stopping the rotation of the cruciform supporting structure, serves to prevent violent stresses being imparted to the gear train between the belt and its driving motor 25.

Where the dialogue is relatively rapid, the maximum hiatus between the end of one actor's speech and the beginning of that of another will be slightly less than two seconds, i. e., the time required for a 45 degree rotation of the cruciform supporting structure 9. While the first actor is speaking, the carriage supporting the loud-speaker which is next to be used may be brought to the correct position on its arm, and the speaker itself may be properly oriented and tilted. The relative positions of the two actors will, of course, frequently be such as to require a rotative movement of the cruciform supporting structure of but a few degrees, and, in many cases, no rotative movement whatever. Under such conditions, the hiatus necessary between the two speeches will be very slight or perhaps nil, from the viewpoint of the operative requirements of the apparatus. The gear ratio employed in connection with the movements of the control-strip negative forming apparatus are such as to give the values assumed in the preceding paragraph for the operation of the full-size apparatus. It is possible to bring the loud-speaker into closer registration with the picture than is provided for in the showing of the drawings, this showing being merely illustrative.

In co-ordinating the relative rates of manual movement of the several devices comprising the apparatus for making the control-strip negative to the rates assumed for the full-size apparatus, one inch of film-negative feed is adopted as the equivalent of one second of time. Thus, the ratio of the gears 372, 383, 387, 388, 392, 393 (Figs. 30, 34 and 35), worm 449, worm-wheel 448 and film-negative driving sprocket-wheel 456 (Figs. 30, 34 and 36) is such that one revolution of the hand-wheel 348 produces three inches of film-negative feed. As hereinbefore stated, the step-by-step motor (not shown) which drives the feeding mechanism of the composite picture-and-sound-track film (also not shown) is energized from the distributor 484, as is also step-by-step motor 451 which drives the worm 449. The ratio of the gear train from the picture-and-sound-track film-feeding motor to the reel driven thereby is such as to produce a feeding rate eighteen times that of the rate of the film-negative 457, i. e., one revolution of the hand-wheel 348 produces fifty-four inches of feed of the composite picture-and-sound-track film. The ratio of gears 360, 361, 366, 367 (Figs. 30, 34 and 35), gears 428 and 427 (Fig. 30), and of the lead of the thread of lead-screw 423, is such that 240 degrees movement of the hand-wheel 348, i. e., the equivalent of two seconds of time, traverses the miniature carriage the entire length of its supporting arm. The ratio of gears 372, 373, 377 and 378 (Figs. 30, 34 and 35), and of the gear train corresponding to 137, 136, 133 and 119 (Figs. 9 and 20), which is enclosed in the base of the housing which supports the dummy speaker, such as 431 (Figs. 30 and 35), is so fixed that 240 degrees movement of the hand-wheel 348, i. e., the equivalent of two seconds of time, rotates the dummy speaker 360 degrees about its supporting shaft. The ratio of gears 372, 373, 377 and 378, and of the gear train corresponding to 142, 143, 146, 147, 149, 151, 152, 155 and 156 (Figs. 9, 14 and 19), which rotates the dummy speaker in its trunnion bearings, is such that 240 degrees movement of the hand-wheel 348, i. e., the equivalent of two seconds of time, effects 360 degrees of such rotative movement.

Reference is now made to Fig. 38, wherein is shown a switchboard, indicated generally by the reference numeral 485, and adapted to be installed on the sloping table portion (Fig. 30)

of the housing 346. This switchboard is provided with thirty-seven manually-operable switches for governing circuits (hereinafter to be described) which include various electrical translating devices employed in connection with the operation of the apparatus for forming the control-strip negative. The switches are so arranged and so designated, by legends and symbols, as to assist the operator in locating and manipulating them. Under the heading "Top" are seven switches, the respective functions of which are as follows: switch 486 controls a circuit which governs the inward feeding of the carriage of arm $t$ (Figs. 30 and 35); switch 487, the outward feeding thereof; switch 488, the rotation in a counter-clockwise direction about its supporting shaft of the dummy speaker and bracket on said carriage; and switch 489, the lighting of a lamp in the manifold 465 (Figs. 30 and 35) which will light-fog a path on the film-negative 457, the positive of which path will be operative in the full-size apparatus, to actuate devices which will direct current impulses from the amplifier 321 (Fig. 28) to the electromagnetic sound-reproducing device installed within the loud-speaker on arm T (Figs. 1 and 2). Switch 490 controls a circuit which governs the rotation, in a clockwise direction about its supporting shaft, of the dummy speaker and bracket on the carriage of arm $t$; switch 491 the rotation of the dummy speaker carried by arm $t$ in a counter-clockwise direction in its trunnion bearings; and switch 492 the rotation of said dummy speaker in a clockwise direction in its trunnion bearings. The seven switches opposite the word "Left" function in the same manner with reference to the carriage and the dummy speaker on the arm $l$; the seven switches opposite the word "Right" similarly function with reference to the same devices carried by arm $r$; and the seven switches below the word "Bottom" similarly function with reference to the same parts carried by the arm $b$.

The nine "Miscellaneous" switches in the lower row are for the following purposes: switch 493 controls the rotation, in a counter-clockwise direction, of the miniature cruciform supporting structure 415 (Fig. 35); switch 494, the direct feeding of the film-negative 457; switch 495, the direct feeding of the composite picture-and-sound-track film; switch 496, the lamps which illuminate the miniature cruciform supporting structure 415; switch 497, the supply of current from the main to the control-strip negative forming apparatus; switch 498, the lamp of the picture-and-sound-track film projecting machine; switch 499, the reverse feeding of the composite picture-and-sound-track film; switch 500, the reverse feeding of the film-negative 457; and switch 501, the rotation, in a clockwise direction, of the miniature cruciform supporting structure 415 (Fig. 35).

Reference is now made to Figs. 39 and 40, comprising a wiring diagram for the control-strip negative forming apparatus, and a schematic illustration of the various electrical translating devices included in the circuits. Current flowing from a source of electrical energy (not shown) is delivered to mains 502 and 503 (main 503 being connected to the housing 346 in order to constitute said housing a common ground for many of the circuits). The closing of the main switch 497 connects the main 502 to a common line 511, to which are connected the thirty-seven manually-operable switches shown in Fig. 38 and which have just been described. Upon the closing of switch 488 which, as has been explained, controls the counter-clockwise rotation, about its supporting shaft, of the dummy speaker 431 on arm $t$ of the miniature cruciform supporting structure 415 (Figs. 30 and 35), a portion of current flows through the following circuit: from common line 511 through line 512, through switch 488, through a line 513 common to the dead side of each of the eight switches which control the rotation, in one direction and in two planes, of the four dummy speakers, through line 514 to one terminal of the winding of the left-hand unit of the duplex distributor 483, and through said winding to ground—thereby causing the magnet of said unit to attract its armature and thus permit of the rotation of the distributor brush-block. Another portion of current flows through line 530, line 532, one of the conductors 414 (Figs. 30 and 35), through a spring-mounted trolley 163 (Figs. 31 and 32) mounted on an insulating block 416 (Fig. 30), through a conductor 161$a$ mounted on said block 416 and in electrical contact with said trolley, through another spring-mounted trolley 163$a$, mounted on and insulated from the carriage 422, through a conductor 504 connecting with a conductor 191$a$ mounted on the carriage in proximity to the rotatable housing which supports the dummy speaker, thence by a suitable brush (not shown) to a conductor 192$a$, mounted on the said rotatable housing; through lines 505 and 506 to one terminal of the winding of a magnet 434, through said winding and thence by a common line 523 to ground. A further portion of current flows from line 530 through a film-fogging lamp 507 (installed in one of the compartments of the lamp manifold 465), through a common line 531 connected to which are all sixteen lamps required for making negatives of light-tracks which shall reproduce, in the full-size apparatus, the rotative movements, in both directions, of the eight step-by-step motors mounted on the four miniature carriages; and thence from said common line 531 to ground. A still further portion of current flows from line 514 through line 515 to the common connection of the distributor brush-block 516. Upon the manual rotation of the hand-wheel 348, current impulses are delivered from the left-hand unit of the duplex distributor 483, through lines 517, 518 and 519, successively to the field coils of the step-by-step motor 432, through the line 520 common to said field coils, through a contact member 521 mounted on the armature of the magnet 434 and brought into electrical connection (by the energization of the winding of said magnet in the manner hereinbefore described) with a contact member 522 (mounted on the magnet frame), through said contact member 522 and thence by a common line 523 to ground. Hence the step-by-step motor 434 will rotatively follow the turning of the hand-wheel 348.

Before starting the rotation of the hand-wheel 348, switch 500 (Fig. 40) is closed, whereupon one portion of current flows as follows: from common line 511, through line 597, through switch 500, line 577, line 572 to one terminal of the winding of a magnet 569, through said winding and thence by a common line 570 to ground, thereby energizing the magnet winding, causing it to attract its armature, and bringing a contact member 568, carried by the armature, into electrical connection with a contact member 568', mounted on the frame of the magnet. Another portion of current flows from common line 511 through line 597, through switch 500, common line 573 connecting the dead sides of the two switches of this group, through line 574 to one terminal of the winding of the right-hand unit of the duplex distributor 484, and thence through said winding to ground—thereby causing the magnet of said unit to attract its armature and thus permit of the rotation of the distributor brush-block. A third portion of current flows from line 574 through line 575 to a common line connected to the brushes of the distributor-block 576, upon the rotation of which brush-block current impulses are successively conveyed, in the manner hereinbefore described, to the lines 564, 565 and 566, through the field coils of step-by-step motor 461, through the line 567 common to said field coils, through contact members 568 and 568', and thence through common line 570 to ground. Hence step-by-step motor 461 will rotatively follow the turning of the hand-wheel 348, and feed the negative-film in a reverse direction past the film-fogging lamp 507, thereby forming the negative of a light-track which will automatically reproduce, in the full-size apparatus, the rotary movements of the dummy speaker.

Also before starting the rotation of the hand-wheel 348, switch 499 (Fig. 40) is closed, whereupon current flows as follows: from common line 511, through line 598, switch 499, line 599, line 600 to one terminal of the winding of a magnet 578, through said winding and thence by a common line 604 to ground, thereby energizing the magnet winding, causing it to attract its armature and to bring a contact member 602, carried by the armature, into electrical connection with a contact member 603, mounted on the frame of the magnet. Hence, upon the rotation of the distributor brush-block 576, current impulses will be successively conveyed, in a manner hereinbefore described, from lines 564, 565 and 566, through the field coils of step-by-step motor 579, through line 601 common to said field coils, through contact members 602 and 603, and thence through the common line 604 to ground. Thus, the step-by-step motor 579 will rotatively follow the turning of the hand-wheel 348 and feed the picture-and-sound-track film in a reverse direction.

The closing of the three switches 488, 500 and 499 and the subsequent rotation of the hand-wheel 348 will thus produce the following results: (1) the dummy speaker 431 of the arm $t$ of the miniature cruciform supporting structure will be caused to rotate about its supporting shaft in a counter-clockwise direction (this dummy being presumed, for purposes of explanation, to be already properly located in registration with the picture on the window-pane 478 of the actor who is next to speak); (2) the lamp 507 will be lighted; (3) the negative-film from which is to be produced the positive control-strip will be fed past the lamp, forming on said negative-film a light-fogged path—the length of this path corresponding to the extent of rotation of the dummy speaker, and thus providing means whereby a photoelectric cell, such as 236a (Fig. 28), occupying the same position in the cell manifold 234 (Figs. 22, 23 and 28) relative to the positive control-strip that lamp 507 occupies in the lamp-manifold 467 (Figs. 30 and 36) relative to the negative-film, will govern circuits which include electrical translating devices operative to cause the loud-speaker 128 (Figs. 1 and 2) of the full-size apparatus to be rotated in the same direction and to the same extent as was the dummy speaker; and (4) the picture-and-sound-track film will be fed in a reverse direction, in order to maintain the co-ordination of feed of said film and the negative-film which is to produce the positive control-strip.

Closing of switch 490 (Fig. 39) will cause one portion of current to flow from the common line 511 through switch 490, through common line 513 and line 528 to one terminal of the magnet winding of the right-hand unit of the duplex distributor 483, through said winding and thence by a common line to ground—thereby energizing said magnet winding, causing it to attract its armature and to permit of the rotation of the distributor brush-block of said unit. Another portion of current flows from said common line 511 through switch 490, line 606, film-fogging lamp 510, and thence by common line 531 to ground—thereby lighting said lamp. A further portion of current flows from said common line 511, through switch 490, line 606, line 607, through various conductors corresponding to 414, 163, 161a, 163a, 504, 191a and 192a (hereinbefore described in explaining the counter-clockwise rotation of the dummy speaker with reference to its supporting shaft), through line 506, winding of magnet 434, and thence through common line 523 to ground. The contacts 521 and 522 are thereby brought into electrical connection. Upon the rotation of the hand-wheel 348, current impulses from the distributor brush-block 529 will be successively conveyed, through lines 517, 518 and 519, to the field coils of the step-by-step motor 432, through a line 520 common to said field coils, through contacts 521 and 522, and thence by common line 523 to ground. Inasmuch as the right-hand unit of distributor 483 rotates in a direction opposite to that of the left-hand unit, the step-by-step motor, following the distributor unit from which it is receiving its current impulses, will now rotate in a clockwise direction. The switches 500 and 499 which respectively control the feeding, in a reverse direction, of the negative-film and the picture-and-sound-track film will function in the same manner as hereinbefore described. There will thus be formed on the negative-film a light-fogged path which, in a positive made therefrom, will constitute a light-track operative to effect, in the full-size apparatus, the rotation, in a clockwise direction with reference to its supporting shaft, of the loud-speaker which is mounted on the arm T (Figs. 1 and 2).

Upon the closing of switch 491, one portion of current lights the lamp 508 in the same manner as switch 488 has been described as effecting the lighting of lamp 507. Another portion of current flows through various conductors, similar to 414, 163, 161a, 163a, 504, 191a and 192a, which have been hereinbefore described, through a line 609, a line 533, to one terminal of the winding of a magnet 435, through said winding and thence through a common line 527 to ground—thereby energizing said magnet winding, causing it to attract its armature and to bring into contact members 525 526, in a manner similar to that which has been hereinbefore described in explaining the operation of magnet 434. A further portion of current flows from the common line 513 through line 514, and through the winding of the magnet of the left-hand unit of the duplex distributor 483, thus rendering the distributor brush-block 516 operative, in a manner hereinbefore described in explaining the operation of step-by-step motor 432. The subsequent rotation of the hand-wheel 348 will thus cause current impulses successively to flow through the field coils of step-by-step motor 433, through the line 524 common to said field coils, through the contact members 525 and 526, and thence by common line 527 to ground. The switches 500 and 499 which control respectively the reverse feeding of the negative-film and the picture-and-sound-track film, and which are presumed to have been closed, will function in the same manner as hereinbefore explained. The rotation of the hand-wheel will thus effect the counter-clockwise rotation, in its trunnion bearings, of the dummy speaker 431 of arm t.

Upon the closing of switch 486 (Fig. 4), one portion of current flows from common line 511 through line 538, through said switch 486, a line 536 common to the dead sides of the four switches of this group, through a line 546 to one terminal of the magnet winding of the left-hand unit of the duplex distributor 482, and through said winding to ground. Another portion of current flows through a line 539, a line 543, conductor 414', trolley 163', conductor 161b, a line 543, a line 544 to one terminal of the winding of a magnet 430, through said winding and thence by a common line 545 to ground. A further portion of current flows through a line 539, through a film-fogging lamp 540 and through the common lamp line 541 to ground. A still further portion of current flows from line 546 to a common contact of the brushes of the brush-block of the distributor 548, thence successively (upon the rotation of the hand-wheel 348) through line 549, line 550 and line 551, through the field coils of step-by-step motor 431, through the line 552 common to said field coils, through a contact member 553 mounted on the armature of magnet 430 and theretofore brought (through the energization of the winding of said magnet) into electrical connection with a contact member 554 mounted on the frame of said magnet, through said contact member 554, and thence through a common line 545 to ground.

The subsequent rotation of hand-wheel 348 will cause step-by-step motor 431 to inwardly feed the carriage which is supported on arm t of the miniature cruciform supporting structure. The switches 500 and 499 being assumed to have been previously closed, the rotation of the hand-wheel 348 will also feed the negative-film past the lamp 590 (which has been lighted in the manner described), thus forming a light-fogged path on said negative-film for producing a light-track on the positive control-strip; and simultaneously feeding, in a reverse direction, the composite picture-and-sound-track film.

The closing of switch 487 (Fig. 40) will, in a similar manner, result in the outward feeding of the carriage which is supported on arm t, in the forming of another light-fogged path on the negative-film, and in simultaneously feeding in a reverse direction the composite picture-and-sound-track film. In the latter case, the right-hand unit of the duplex distributor 482 is rendered operative to deliver to the step-by-step motor current impulses in a direction opposite to that of the impulses delivered by the left-hand unit of said distributor.

Upon the closing of switch 493 (Fig. 40), current flows from the common line 511, through a line 580, through said switch 493, through film-fogging lamp 493a, through a line 581 to one terminal of the winding 53' of the magnetic clutch 417, through said winding and thence by a line 582 to ground. The subsequent rotation of hand-wheel 348 produces a counter-clockwise rotation of the miniature cruciform supporting structure. The switches 500 and 499 having been closed before starting the rotation of the hand-wheel, the negative-film will be fed in a reverse direction past the film-fogging lamp 493a, and a light-fogged path will be formed thereon. The composite picture-and-sound-track film will also be fed in a reverse direction.

The closing of switch 501 will similarly light the lamp 501a, and effect, upon rotation of the hand-wheel 348, the clockwise rotation of the miniature cruciform supporting structure, a feeding of the negative-film in a reverse direction, the formation thereon of another light-fogged path, and the reverse feeding of the picture-and-sound-track film.

Upon the closing of switch 489 (Fig. 40), current flows from the common line 511, through a line 586, through said switch 489, through a film-fogging lamp 588, and through a common line 589 to ground. The switches 500 and 499 having been closed, rotation of the hand-wheel 348 will produce a feeding of the negative-film in a reverse direction, a light-fogged path will be formed thereon, and the picture-and-sound-track film will be fed in a reverse direction. The positive light-track produced from this negative will operate, in the full-size apparatus, to switch from the amplifier to the loud-speaker 128 on arm T the electrical impulses which are to actuate the diaphragm of said loud-speaker. The remaining three switches of this group similarly control the actuating of the diaphragms of the other three loud-speakers.

Upon the closing of switch 496 (Fig. 40), current flows from the common line 511, through a line 590, through said switch 496, through line 591, through the four lamps such as 479, and through the common line 592 to ground—thereby illuminating the mechanisms behind the window-pane 478.

Upon the closing of switch 498 (Fig. 40), current flows from the common line 511, through line 593, through said switch 498, through line 594, through lamp 595 of the picture-and-sound-track film projector (not shown), and through the line 596 to ground, thereby lighting said lamp and projecting the picture-frames and their accompanying sound-track upon the window-pane 478.

The method of manipulation employed in forming the negative from which the positive control-strip is to be produced is as follows: as will be noted from Figs. 29, 30 and 34, the wheel 350 is calibrated to indicate degrees and fractions of inches. Mounted on the front wall of the housing 346 is a pointer 350a co-operative with said degree and fraction indications. With the film 457 in position to be fed from one of the reels 438 or 453 (Figs. 30, 34 and 36) to the other of said reels; with the picture-and-sound-track film in position to be fed through its projecting apparatus; with detents 352 and 357 out of engagement; and with the wheel 350 so positioned that the pointer 350a indicates zero on said wheel, the operator closes switch 494 which controls the direct feed of the film which is to form the negative, and also closes switch 495 (Figs. 38 and 40) which controls the direct feed of the picture-and-sound-track film projecting apparatus. A picture-frame and a portion of the sound-track are thereby projected upon the window-pane 478 (Fig. 37). He then rotates hand-wheel 348 (Figs. 29, 30 and 34), thereby effecting a direct feed of the negative-film and of the picture-and-sound-track film. In the process of this feeding, he observes the sound-track projection, or notes the sound emanating from a sound-projector synchronously operating with the feeding of the said picture-and-sound-track film, or both. Upon reaching a point in the feeding operation where speech begins on the part of one of the actors, he brings detent 357 into engagement with one of the apertures formed in the outer flange of the wheel 350, and detent 352 into engagement with one of the depressions 351 formed in the periphery of the hand-wheel 348. Switches 494 and 495, which effect the direct feeding of the two films, are then opened; and switches 499 and 500, which effect the reverse feeding thereof, are closed. Hand-wheel 348 is then again rotated in the same direction as before until the pointer 350a indicates 240 degrees, which, as has been stated, is the equivalent of two seconds of time in the operation of the full-size apparatus. This 240 degrees rotation of the hand-wheel will feed the picture-and-sound-track film backward 2 36 inches and the negative-film backward 2 inches, so that, in the operation of the full-size apparatus, the moving, orienting and tilting of the loud-speaker will have been effected two seconds before the beginning of the particular speech. Detent 357 is then disengaged and wheel 350 is rotated to bring the zero thereon opposite the pointer 350a. There is thus established a starting point from which the negative-film is to be fogged in order to produce paths for forming light-tracks in the positive control-strip which is later to be made from said negative-film.

Assuming, now, that the picture of the actor who is about to speak is so located on the window-pane 478 as to require a counter-clockwise rotative movement of 30 degrees, from its previous position, of the miniature cruciform supporting structure 415 (Fig. 35): the operator closes switch 493 (Figs. 38 and 40) and proceeds to rotate the hand-wheel 348 to the extent of 150 degrees, as indicated by observation of the calibrations of wheel 350 in conjunction with the pointer 350a, and also as indicated by his sense of touch in noting the passage of fifty of the depressions 351 under the detent 352. As appears from Fig. 40, the closing of switch 493 will have energized film-fogging lamp 493a, and the feeding of the negative-film past this lamp will produce a light-fogged path the length of which corresponds with the 30 degrees rotation of the miniature cruciform supporting structure. When, in the operation of the full-size apparatus, the positive control-strip is fed past the photoelectric cell manifold 234 (Figs. 22 and 23), the light-track formed by this light-fogged path of the negative-film will permit of the passage therethrough of light rays, and the photoelectric cell will be activated which controls the rotation, in a counter-clockwise direction, of the cruciform supporting structure 9— this activation continuing for one and one-quarter seconds, during which period said structure will be rotated thirty degrees. Upon the completion of the foregoing rotation and film-feeding operations in the miniature apparatus, switch 493 is opened, extinguishing the film-fogging lamp 493a and de-energizing the magnet-winding 53' (Fig. 40) of the duplex magnetic clutch 417, thus leaving the miniature cruciform supporting structure 415 in its new position. Switch 499, which controls the reverse feeding of the picture-and-sound-track film, and switch 500, which controls the reverse feeding of the negative-film, remain closed; and the operator proceeds to rotate the hand-wheel 348 in the opposite direction to that which produced the rotative movement of the supporting structure and the reverse feeding of the two films. By thus oppositely rotating the hand-wheel 348, the wheel 350 is brought back to zero and the two films are fed back to the starting point from which the next light-fogged path is to be formed.

Let it now be assumed that the picture of the actor is so located on the window-pane 478 as to require that carriage 431 of the arm $t$ of the miniature cruciform supporting structure be fed inwardly from its previous position to a position wherein its dummy loud-speaker will be on the concentric circle 8 (Fig. 37), i. e., a distance representing one-half the length of its possible travel along said arm $t$: the operator closes switch 486 (Figs. 38 and 40), and proceeds to rotate the hand-wheel 348 in the first-described direction, thereby effecting a reverse feeding of the picture-and-sound-track film and a similar reverse feeding of the negative-film past the film-fogging lamp 540 (Fig. 40); and simultaneously causing step-by-step motor 429 (Fig. 35) to rotate the lead-screw 423 in a direction to produce the inward travel of said dummy loud-speaker carriage. The hand-wheel is thus rotated for 120 degrees, bringing the carriage to the concentric circle 8 (Fig. 37), and forming on the negative-film a light-fogged path corresponding in length to the distance traveled by the carriage. When, in the operation of the full-size apparatus, the positive control-strip is fed past the photo-electric cell manifold 234 (Figs. 22 and 23), the light-track formed by this light-fogged path of the negative-film will permit of the passage therethrough of light rays, and the photoelectric cell will be activated which controls the inward travel of the carriage 92 on the arm T—this activation continuing for one second of time, during which period said carriage will be fed a distance equal to one-half the length of said arm T. Upon the completion of the foregoing carriage-moving and film-fogging operations in the miniature apparatus, switch 486 is opened, extinguishing the film-fogging lamp 540, simultaneously de-energizing the winding of the magnetic switch 430 (Fig. 40), thereby opening the circuit of the step-by-step motor 429, and leaving the carriage in its new position on arm $t$. Switch 499, which controls the reverse feeding of the picture-and-sound-track film, and switch 500, which controls the reverse feeding of the negative-film, remain closed; and the operator proceeds to rotate the hand-wheel 348 in the opposite direction to that which produced the inward feeding of the carriage 431 and the reverse feeding of the two films. By thus oppositely rotating the said hand-wheel 348, the wheel 350 is brought back to zero and the two films are fed back to the starting point from which the next light-fogged path is to be formed.

Assuming, now, that the picture of the actor appears on the window-pane 478 in a position midway between profile and full view, and that his head is inclined downwardly at an angle of 45 degrees; and assuming, further, that the position of orientation of the dummy loud-speaker mounted on the carriage 431 of arm $t$ and its angle of inclination are such as to require a rotative movement of 45 degrees in a counter-clockwise direction of said dummy speaker about its supporting axis, and an upward tilting movement of 45 degrees thereof in its trunnion bearings; the operator closes switch 488 (Figs. 38 and 39), and proceeds to rotate the hand-wheel 348 in the first-described direction, thereby effecting a reverse feeding of the picture-and-sound-track film and a similar reverse feeding of the negative-film past the film-fogging lamp 507 (Fig. 39) which lamp has been energized by the closing of said switch 488; and simultaneously causing step-by-step motor 432 (Figs. 35 and 39) to actuate its gear train in a direction to produce the required counter-clockwise rotation. The hand-wheel is thus rotated for 30 degrees, bringing the dummy loud-speaker into a position of orientation corresponding with that of the projected picture, and forming on the negative-film a light-fogged path corresponding in length with the 45 degrees of rotation of the dummy loud-speaker. Upon completion of the foregoing rotative and film-fogging operations in the miniature apparatus, switch 488 is opened, extinguishing film-fogging lamp 507, simultaneously de-energizing the winding of magnetic switch 434 (Fig. 39), thereby opening the circuit of step-by-step motor 432, and leaving the dummy loud-speaker in its new position with reference to its supporting shaft. Switches 499 and 500 remain closed, and the operator proceeds to rotate the hand-wheel 348 in the opposite direction to that which produced the counter-clockwise rotation of the dummy loud-speaker about its supporting shaft, and the reverse feeding of the two films. The wheel 350 is thus brought back to zero, and the two films are fed back to the starting point from which the next light-fogged path is to be formed.

The operator then closes switch 491 (Figs. 38 and 39) and proceeds to rotate the hand-wheel 348 in the first-described direction, thereby effecting a reverse feeding of the picture-and-sound-track film and a similar reverse feeding of the negative-film past the film-fogging lamp 508 (Fig. 39) which has been energized by the closing of said switch 491; and simultaneously causing step-by-step motor 433 (Figs. 35 and 39) to actuate its gear train in a direction to produce an upward tilting movement of the dummy loud-speaker in its trunnion bearings. The hand-wheel is thus rotated for 30 degrees, bringing the dummy loud-speaker into a position of angular inclination corresponding with that of the projected picture, and forming on the negative-film a light-fogged path corresponding in length with the 45 degrees of tilting movement of the said dummy speaker. Upon completion of the foregoing tilting and film-fogging operations in the miniature apparatus, switch 491 is opened, extinguishing film-fogging lamp 508, simultaneously de-energizing the winding of magnetic switch 435 (Fig. 39), thereby opening the circuit of step-by-step motor 433, and leaving the dummy loud-speaker in its new position of inclination. Switches 499 and 500 remain closed, and the operator proceeds to rotate the hand-wheel 348 in the opposite direction, thus bringing the wheel 350 back to zero and the two films back to the starting point from which the next light-fogged path is to be formed.

The determination of the angles of orientation of the actor and of the angles of inclination of his head may be facilitated by comparison of the pictures projected upon the window-pane 478 with photographs taken at known angles.

Instead of projecting the picture-frames upon the window-pane 478, they may be projected upon a screen calibrated to register with said window-pane and hinged to be swung into and out of picture-receiving position, in order to permit of clearer observation of the mechanism of the miniature cruciform supporting structure.

It is to be understood that where the apparatus is to be operated in conjunction with a very large projection-screen, two or more of the structures illustrated in Figs. 1 and 2 may be employed—the control-strip being provided with the necessary additional light-tracks. In some cases it may be desirable to increase the number of arms and loud-speakers to six, eight or more. Alternatively, each of the carriages such as 92 may be movably supported on a table adapted to be automatically raised and lowered with reference to a common stationary supporting structure. In general, the invention contemplates the employment of a supporting structure adapted to meet the operating conditions and to permit of the rapid shifting of the loud-speakers to cover every part of the projection-screen upon which the motion-pictures appear.

In lieu of the step-by-step motors illustrated and described as actuating the loud-speakers of the full-size apparatus, there may be substituted synchronous or other constant-speed motors, continuously rotating, and connected to gear trains by means of duplex magnetic clutches, after the manner in which control is effected of the gear trains illustrated in Figs. 3 and 4.

In lieu of employing a photographic film as a control-strip, such a strip may be formed of thin metal provided with perforations through which light may be projected upon photoelectric cells. Alternatively, the control-strip may be formed of thin insulating material, perforated to provide tracks through which rolls or brushes may directly close electric circuits.

With the picture-and-sound-track film and the control-strip in position in their respective feeding apparatus (driven by synchronous or other constant-speed motors), the feed may be initially co-ordinated by simultaneously manipulating the two rheostats 210 and 210a (Fig. 28).

While the apparatus has been described as being operated in conjunction with photographic sound recording and reproducing apparatus, it will be understood that it is also operative with other types of sound recording and reproducing devices synchronizing with the recording and reproducing of motion-pictures.

The apparatus and methods described and illustrated permit of automatically juxtaposing a sound-projecting device with the pictures from which the voice is presumed to issue, and of orienting and tilting said device to correspond with the position of such a picture. The location and direction of projection of the reproduced voice are thus made true to life; and the use is thereby made possible of a sound-projector having the more or less uni-directional characteristic of the natural human voice. The illusion of a talking picture is thus established—a result which is impossible with the present loud-speakers, which, as has been pointed out, project sound waves purposely made multi-directional in their maximum intensity, in order to distract attention from the lack of coincidence with the pictures of the location and direction of the sound-projector.

The operation of the miniature apparatus in conjunction with the small-scale projection of the actual picture-frames, and the forming of light-fogged paths on the negative-film simultaneously with said operation, permit of later controlling the full-size apparatus with any desired degree of accuracy. Once the negative-film is completed, there may, of course, be printed therefrom any required number of positive control-strips. Thus, where a considerable number of positive control-strips are desired, the labor cost involved in carefully making the negative-film becomes of minor importance.

I claim:

1. In apparatus of the character described, a plurality of movable sound-projectors, electrical translating devices for governing the locations of said sound-projectors, light-responsive means for actuating said electrical translating devices, and means for controlling the operation of said light-responsive means.

2. In apparatus of the character described, the combination of a rotatable structure and a plurality of carriages supported thereby and movable with reference thereto, each of said carriages being provided with a sound-projector rotatable in two planes.

3. In apparatus of the character described, the combination of a projector for motion-pictures, a plurality of movable and rotatable sound projecting devices, means for positioning said devices to project sound waves correlated to said pictures, electrical translating devices for governing said positioning means, means including a plurality of photo-electric cells for actuating said electrical translating devices, a control-strip for said photo-electric cells provided with light-tracks, a source of illumination for projecting light rays through said tracks in order to activate said cells, and means operating in timed relation to said picture projector for governing said control strip.

4. In combination, a motion-picture screen, means for projecting motion-pictures upon said screen, means behind and adjacent said screen for projecting sound waves correlated to the projected pictures, supporting means for said sound-projecting means, a control record correlated in movement with the operation of said picture-projector and said sound-projector, and means governed by said control record for positioning said sound-projector with reference to said supporting means in accordance with varying positions of said pictures.

5. In apparatus of the character described, the combination of a motion-picture screen, means for projecting motion-pictures upon said screen, a sound-projector behind and adjacent said screen and operatively synchronizing with said picture-projecting means, a supporting structure for said sound-projector, means for moving said sound-projector with reference to said supporting structure and in accordance with variations in the positions of the projected pictures, and means correlated in movement with the operation of said projectors for governing said means for moving said sound-projector.

6. In apparatus of the character described, the combination of a motion-picture screen, means for projecting motion pictures thereupon, a sound-projector behind and adjacent said screen and operatively synchronizing with the picture-projecting means, a supporting structure for said sound-projector, an automatically-acting control device for said sound-projector correlated in movement with the operation of said projectors, and means governed by said control device for effecting movements of said sound projector upon said supporting structure, said movements being correlated to varying positions of said projected pictures.

7. In combination, a motion-picture screen, means for projecting motion-pictures upon said screen, a sound-projector behind and adjacent said screen and synchronously operative with said picture-projecting means, a mounting for said sound-projector, means for moving said sound-projector relative to said mounting, electrical translating devices for governing said moving means, and control means correlated in movement with the operation of said projectors for predetermining the operation of said electrical translating devices whereby the movements of said sound-projector are correlated to varying positions of the projected pictures.

8. In apparatus of the character described, the combination of a motion-picture screen, means for projecting pictures thereupon, a sound-projector behind and adjacent said screen and synchronously operative with said picture-projecting means, a mounting for said sound-projector, automatic means for moving said sound-projector upon said mounting and into juxta-position with various portions of said screen upon which said pictures appear, and control means correlated in movement with the operation of said projector for predetermining the operation of said sound-projector moving means.

9. In apparatus of the character described, the combination of a projector for motion-pictures, a screen upon which said pictures are projected, a supporting structure, a device automatically movable and universally rotatable with reference to said supporting structure for projecting through said screen sound waves synchronizing with said motion-pictures, means for moving and rotating said sound-projecting device, and record means for predetermining the operation of said moving and rotating means.

10. In apparatus of the character described, the combination of a motion-picture screen, means for projecting pictures thereupon, a plurality of devices behind and adjacent said screen for projecting sound waves correlated to said pictures, supporting means for said sound-projecting devices, means for moving said sound-projecting devices relatively to each other, relatively to said supporting means, and relatively to said screen, and record means correlated in movement with the operation of said picture-projecting and sound-projecting means for governing said sound-projector moving means.

11. In apparatus of the character described, the combination of means for projecting motion-pictures, a screen for receiving the projected pictures, a supporting structure, a plurality of movable and universally rotatable devices mounted on said structure for projecting through said screen sound waves synchronizing with said pictures, means for moving and rotating said sound-projecting devices in accordance with varying positions of said projected pictures, and record means for governing the operation of said moving and rotating means.

12. In apparatus of the character described, the combination of a picture-projector, a screen for receiving the projected pictures, a supporting structure, a plurality of movable and rotatable devices mounted on said structure for projecting through said screen sound waves synchronizing with the images projected by said picture-projector, means for moving and rotating said sound projecting devices in accordance with varying positions of said pictures, and control means operatively synchronizing with said picture-projector and said sound-projecting devices for governing the action of said moving and rotating means.

13. In apparatus of the character described, the combination of a motion-picture projection screen, a projector for projecting motion-pictures thereupon, a device behind and adjacent said screen for projecting sound waves synchronizing with the projected pictures, a mounting for said sound-projector, means for moving said sound-projector with reference to said mounting in order to juxtapose said sound-projector to said pictures, and record means correlated in movement to the operation of said projectors for governing said sound-projector moving means.

14. In apparatus of the character described, the combination of a motion-picture projection screen, a projector for projecting motion-pictures thereupon, a sound-projector behind and adjacent said screen and operatively synchronizing with said picture-projector, a supporting structure for said sound-projector, means for moving said sound-projector with reference to said supporting structure and into juxtaposition with the projected pictures, and a predetermined control device correlated in movement to the operation of said projectors for governing the movements of said sound-projector moving means.

HARRY D. MORTON.